(12) United States Patent
Mamiya et al.

(10) Patent No.: US 6,778,168 B2
(45) Date of Patent: Aug. 17, 2004

(54) METHOD FOR DISPLAYING IMAGE, IMAGE DISPLAY SYSTEM, HOST SYSTEM, IMAGE DISPLAY APPARATUS, AND INTERFACE FOR DISPLAY

(75) Inventors: Johji Mamiya, Sagamihara (JP); Kazushi Yamauchi, Yamato (JP); Takatoshi Tomooka, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/782,976

(22) Filed: Feb. 14, 2001

(65) Prior Publication Data

US 2001/0030649 A1 Oct. 18, 2001

(30) Foreign Application Priority Data

Feb. 14, 2000 (JP) .................................... 2000-035706

(51) Int. Cl.⁷ ................................................ G09G 5/00
(52) U.S. Cl. ....................................................... 345/204
(58) Field of Search .............................. 345/204, 112, 345/334, 344; 370/395, 253; 725/29, 31; 463/41

(56) References Cited

U.S. PATENT DOCUMENTS

| | | | | |
|---|---|---|---|---|
| 4,835,530 A | * | 5/1989 | Morita et al. ............... | 340/732 |
| 5,587,997 A | * | 12/1996 | Jacobson ..................... | 370/253 |
| 5,654,746 A | * | 8/1997 | McMullan et al. ........... | 725/29 |
| 5,781,775 A | * | 7/1998 | Ueno .......................... | 395/672 |
| 5,935,005 A | * | 8/1999 | Tsuda et al. .................. | 463/41 |
| 6,026,088 A | * | 2/2000 | Rostoker et al. ............. | 370/395 |
| 6,029,046 A | * | 2/2000 | Khan et al. ................... | 725/31 |
| 6,128,015 A | * | 10/2000 | Zenda ......................... | 345/344 |
| 6,174,236 B1 | * | 1/2001 | Tsuda et al. .................. | 463/41 |
| 6,297,794 B1 | * | 10/2001 | Tsubouchi et al. .......... | 345/112 |
| 6,327,254 B1 | * | 12/2001 | Chuah ......................... | 370/328 |
| 6,498,865 B1 | * | 12/2002 | Brailean et al. ............. | 382/239 |
| 6,597,363 B1 | * | 7/2003 | Duluk et al. ................. | 345/506 |

* cited by examiner

Primary Examiner—Vijay Shankar
Assistant Examiner—Prabodh M. Dharia
(74) Attorney, Agent, or Firm—Ido Tuchman; Derek Jennings

(57) ABSTRACT

An image display system includes a host system for executing an application program, a display connected to this host system, and an interface for connecting the host system to the display and used to display an image on the display. This interface enables packetized data including ID information to be transferred from the host system to the display. The interface is composed of a first interface for transferring packetized data together with packet order information and a second interface for enabling less data than the capacity of the first interface to be transferred from the display to the host system together with information of a packet transfer error recognized according to the order information.

18 Claims, 16 Drawing Sheets

[Figure 1]
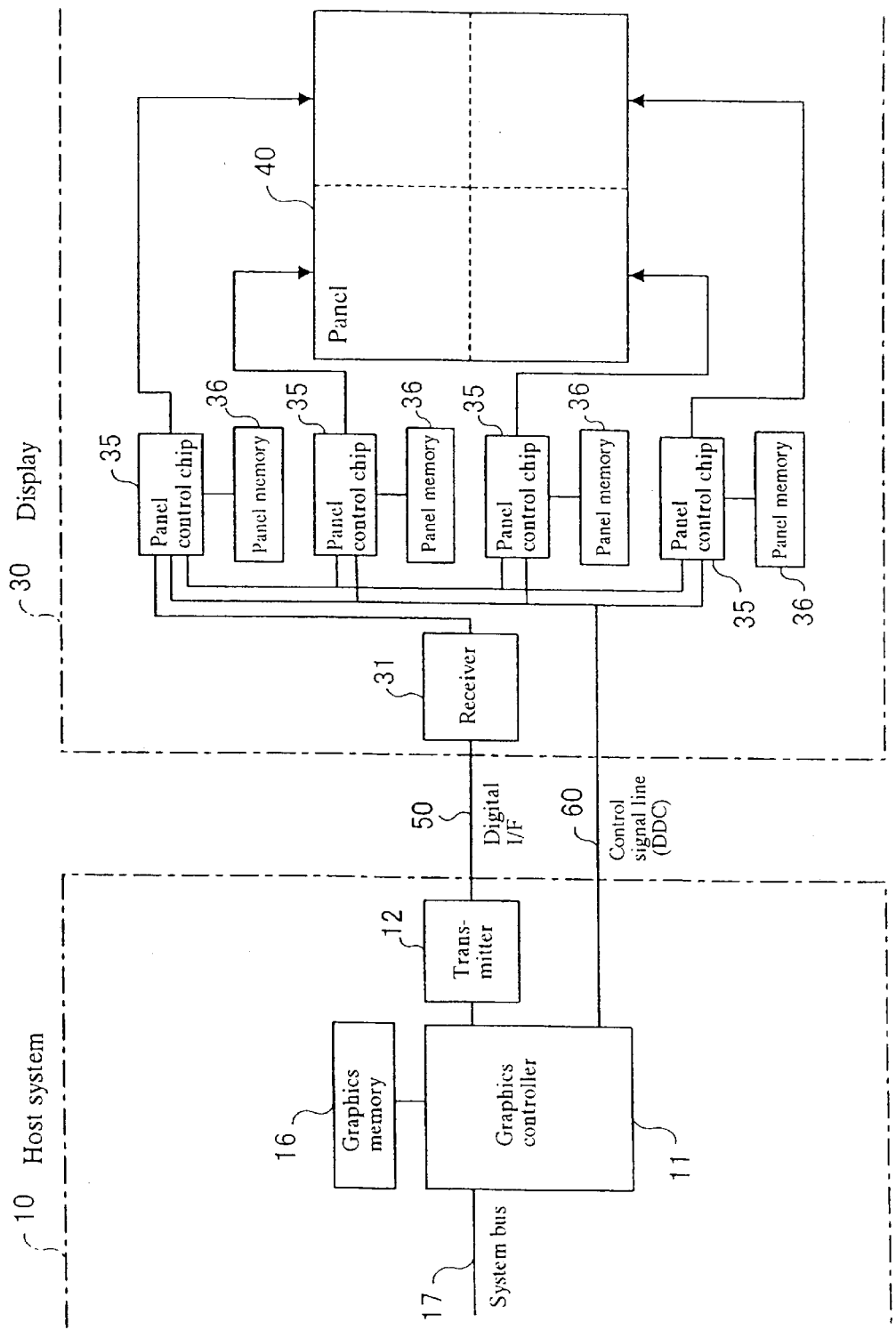

[Figure 2]
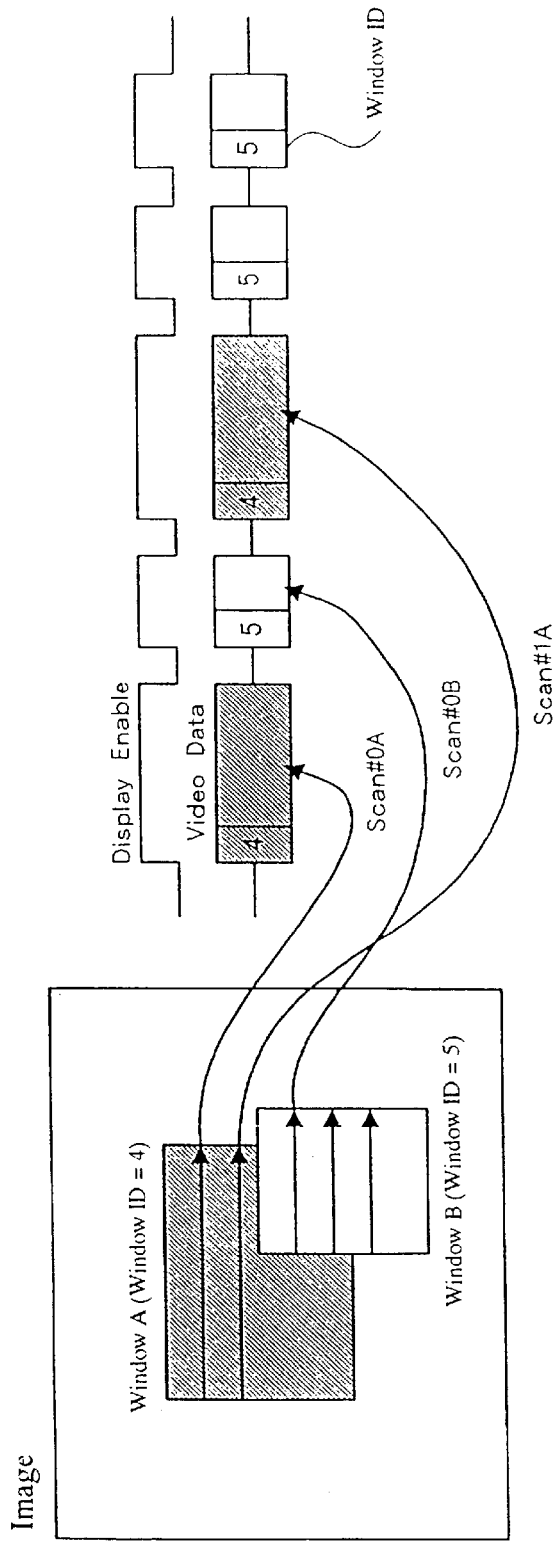

[Figure 3]
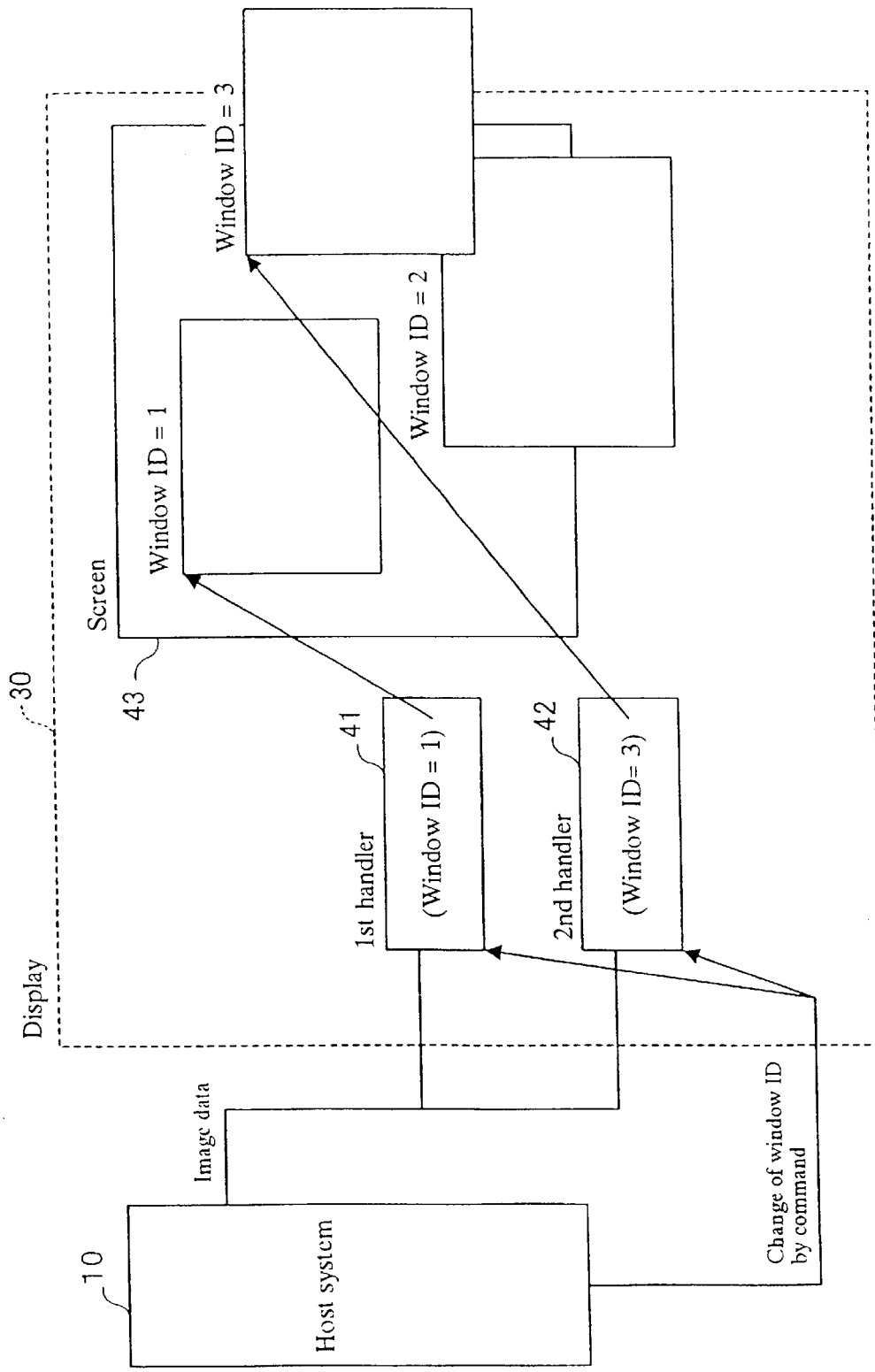

[Figure 4]
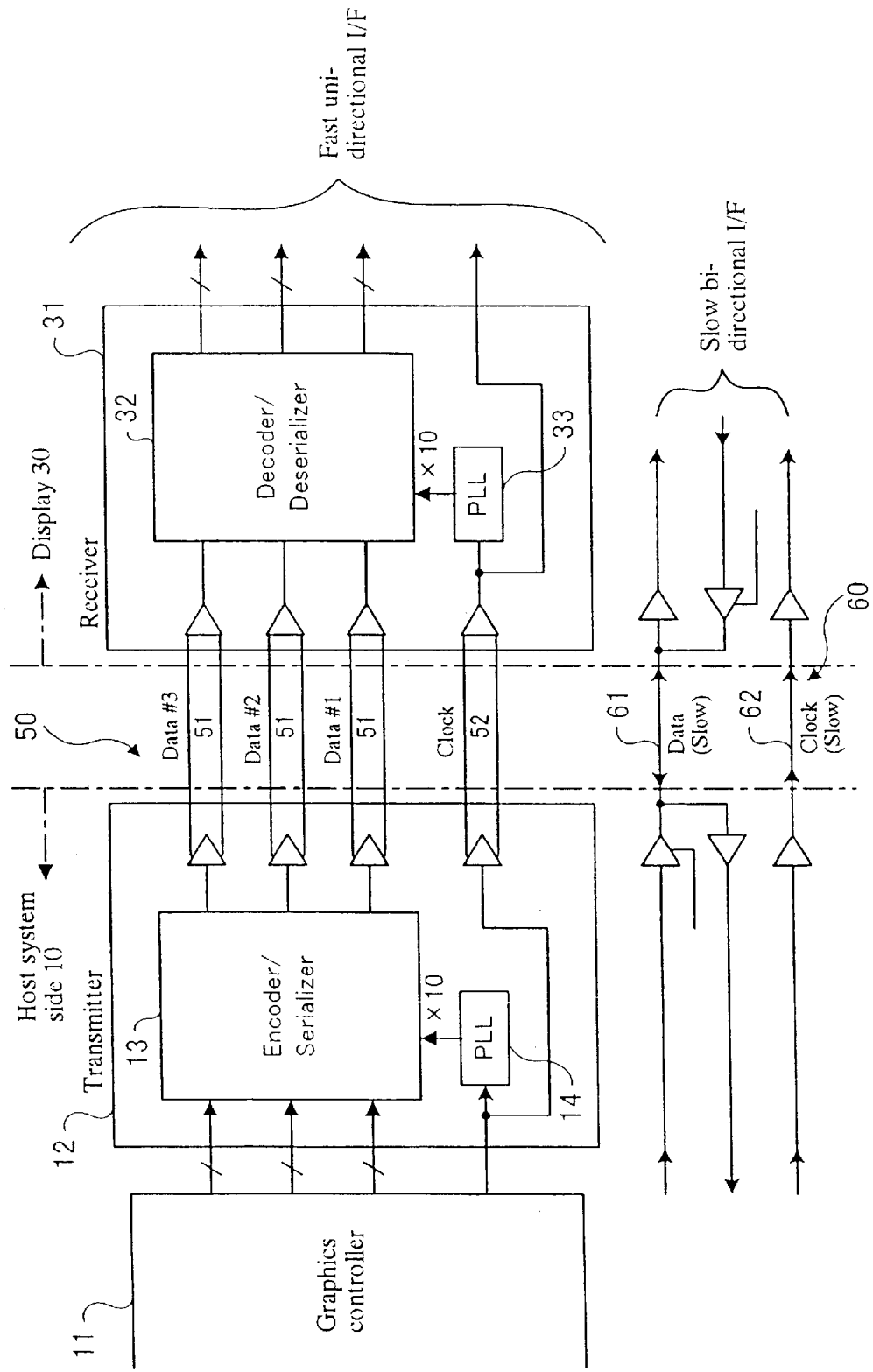

[Figure 5]
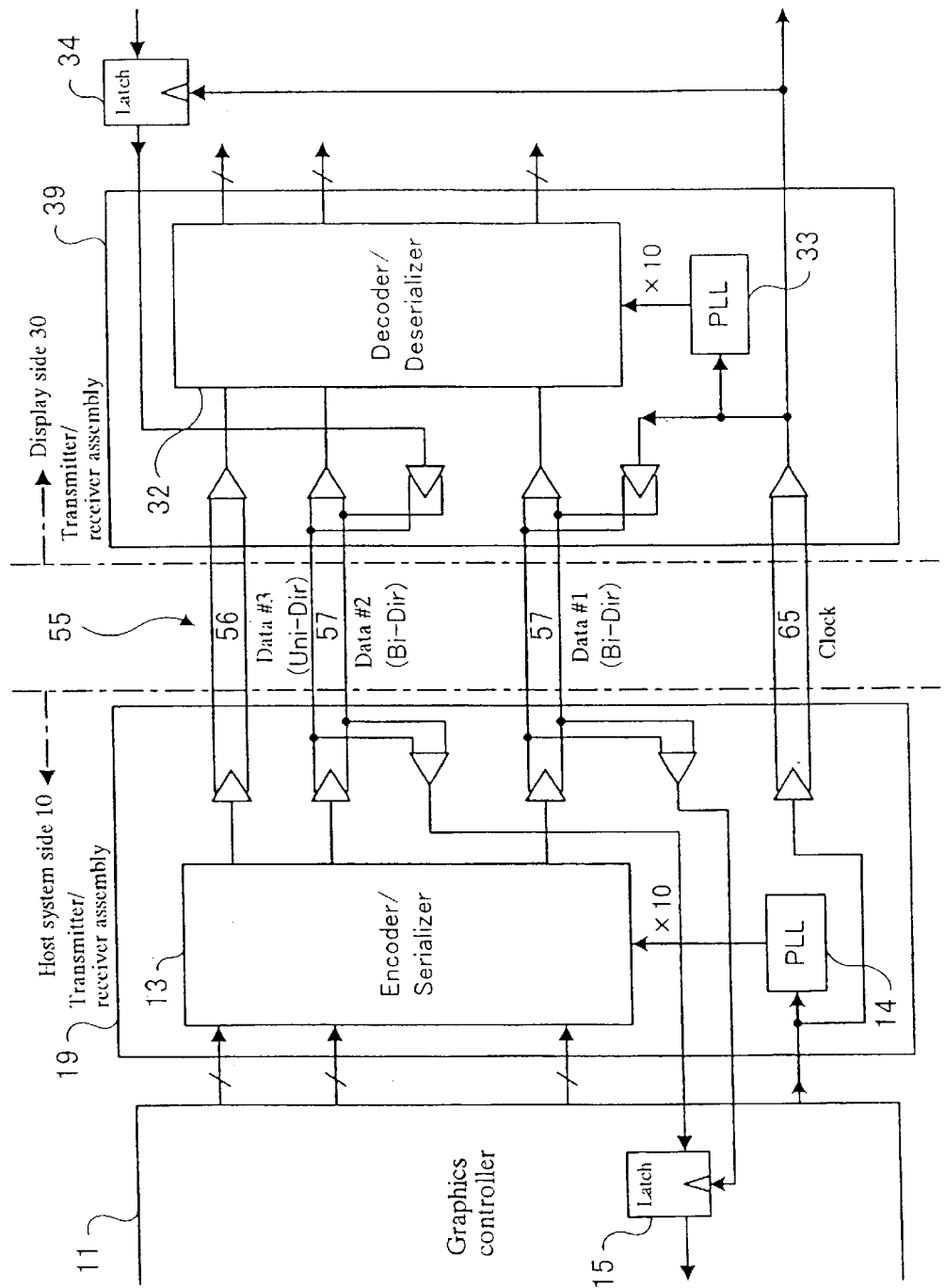

[Figure 6]
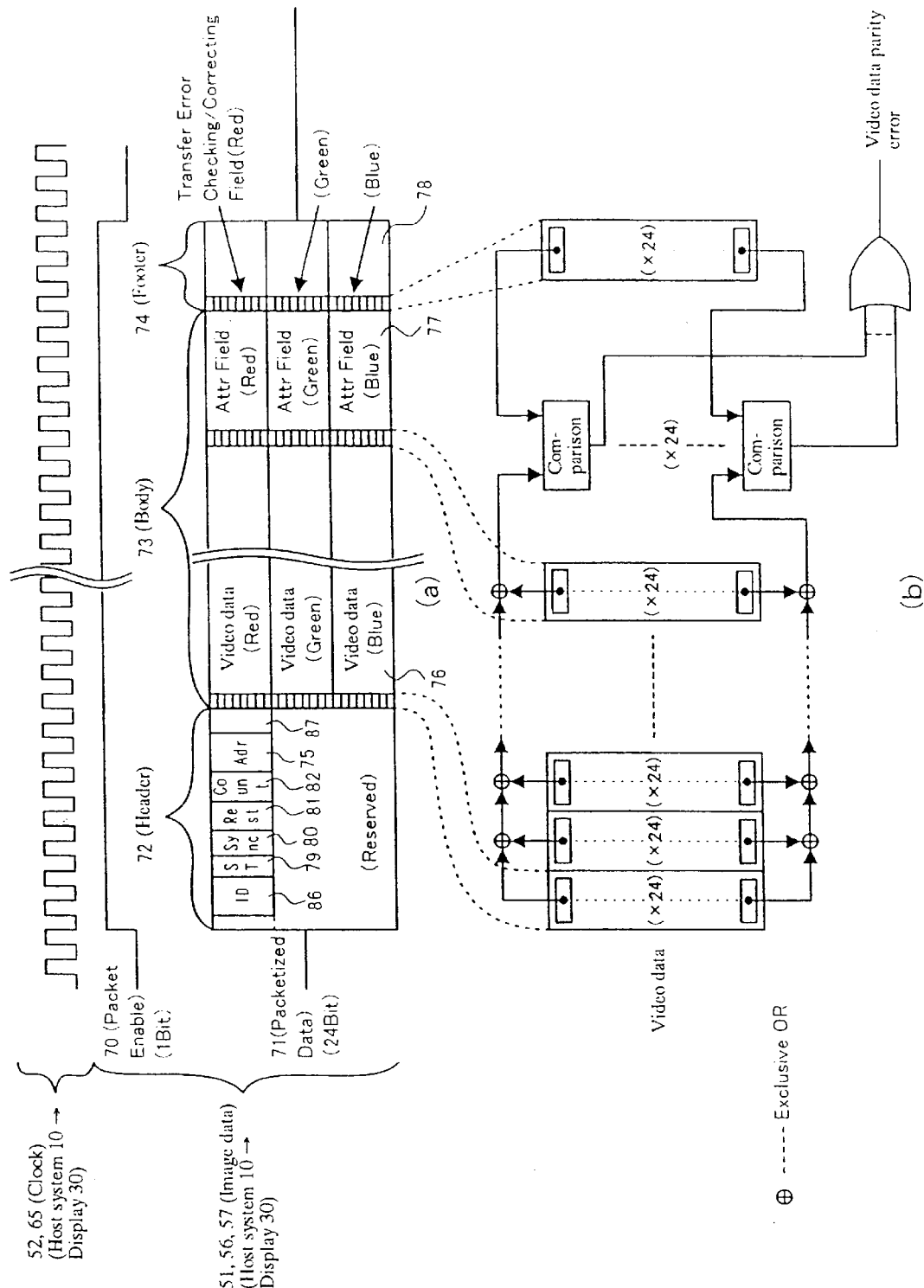

[Figure 7]
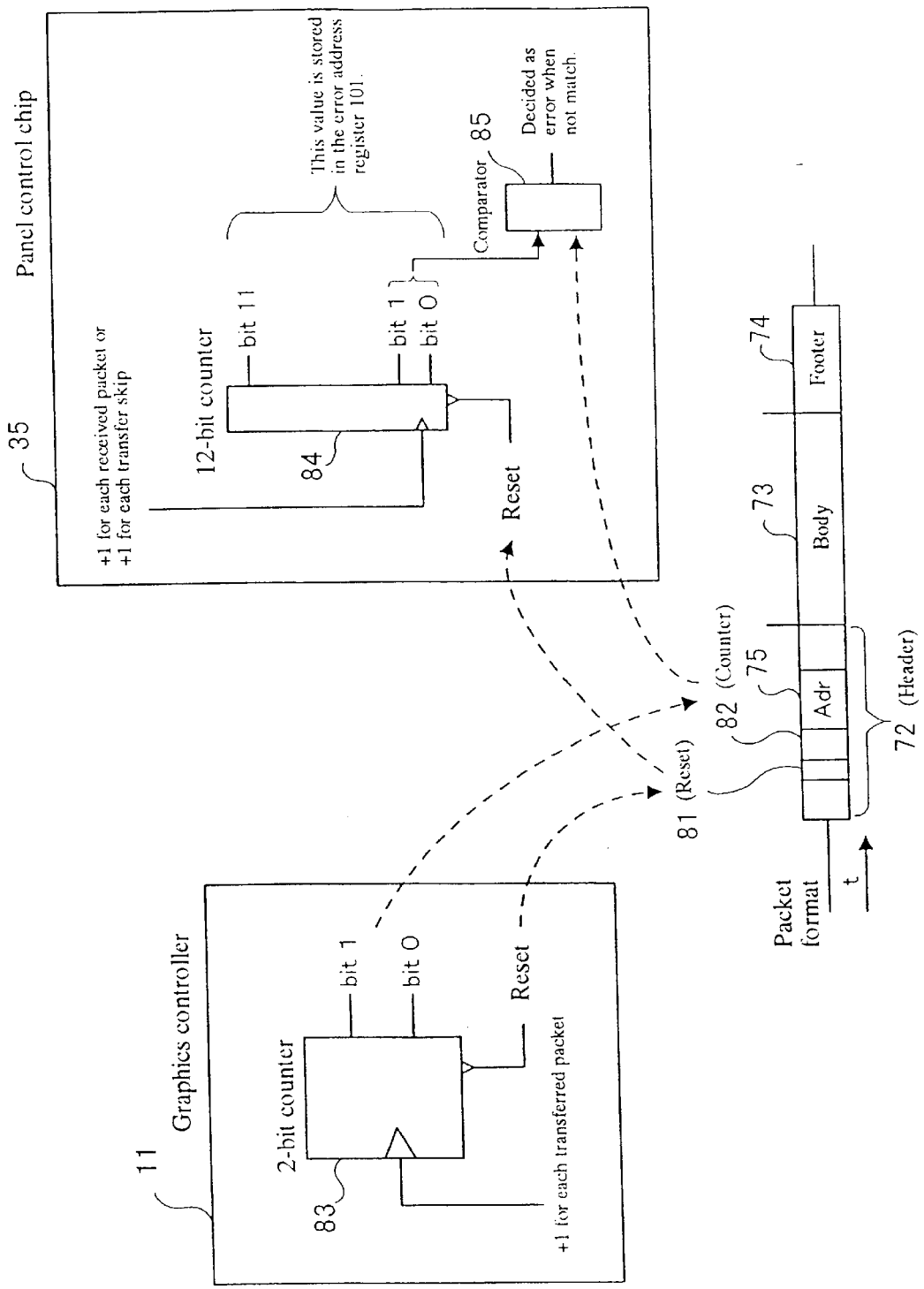

[Figure 8]
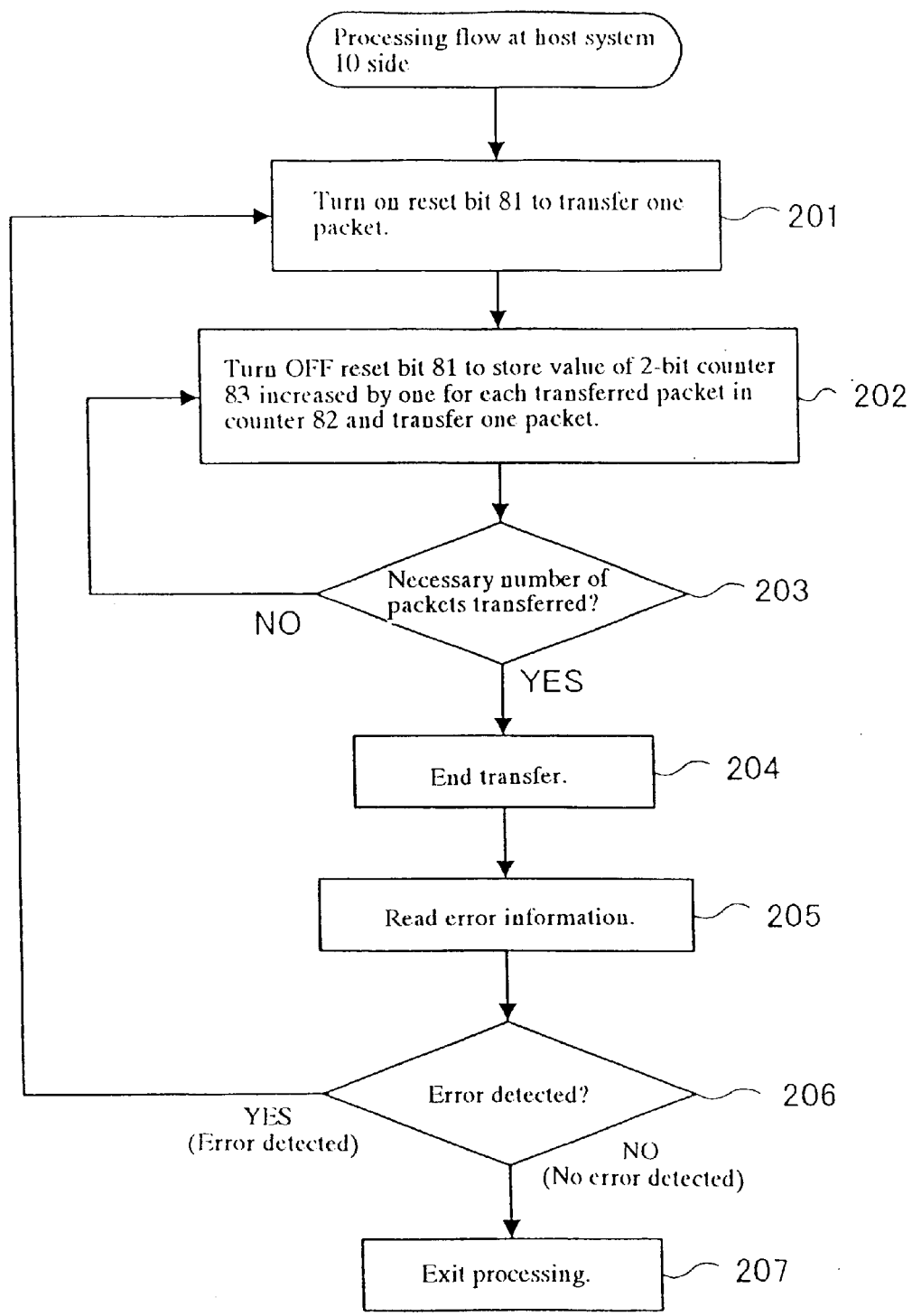

[Figure 9]
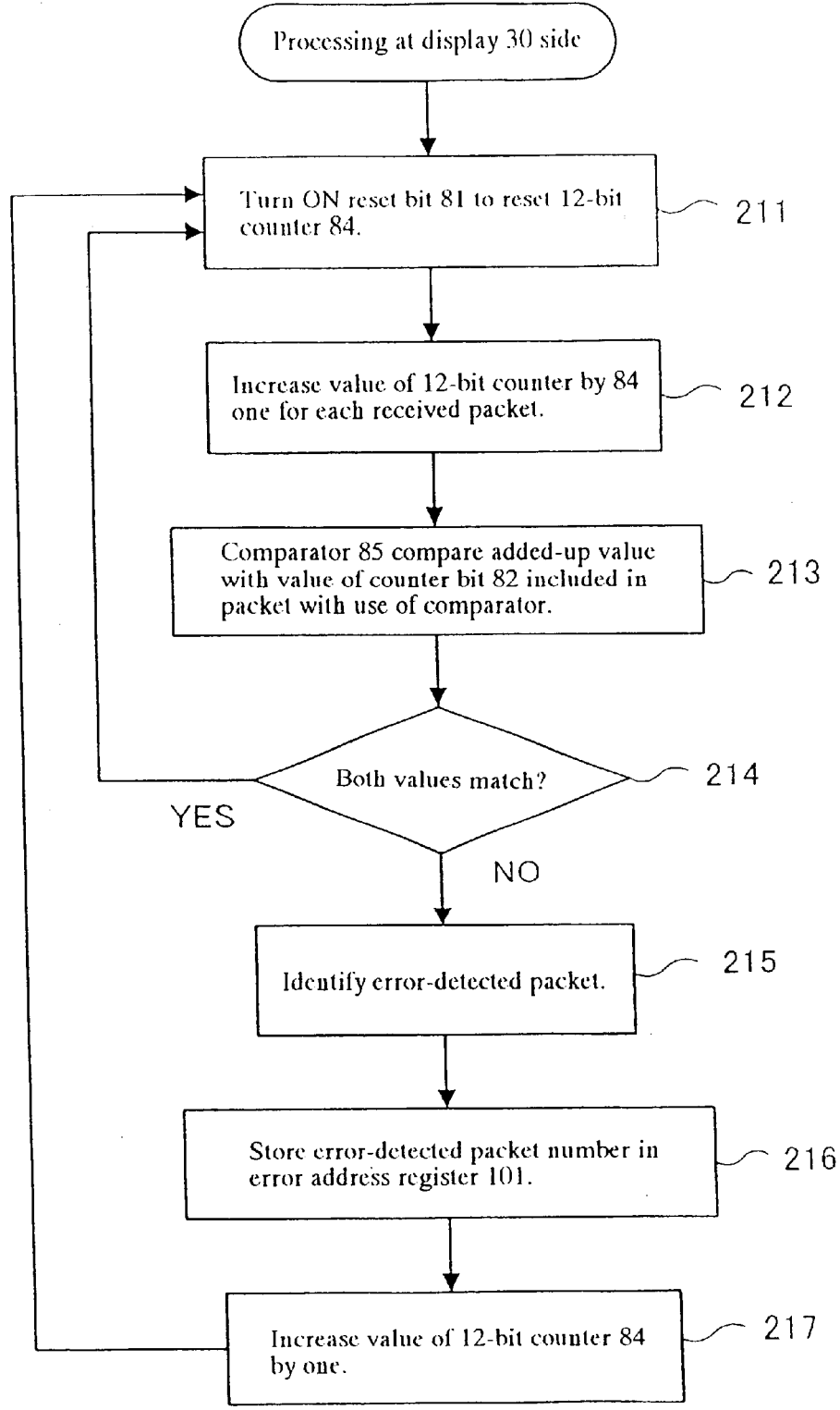

[Figure 10]
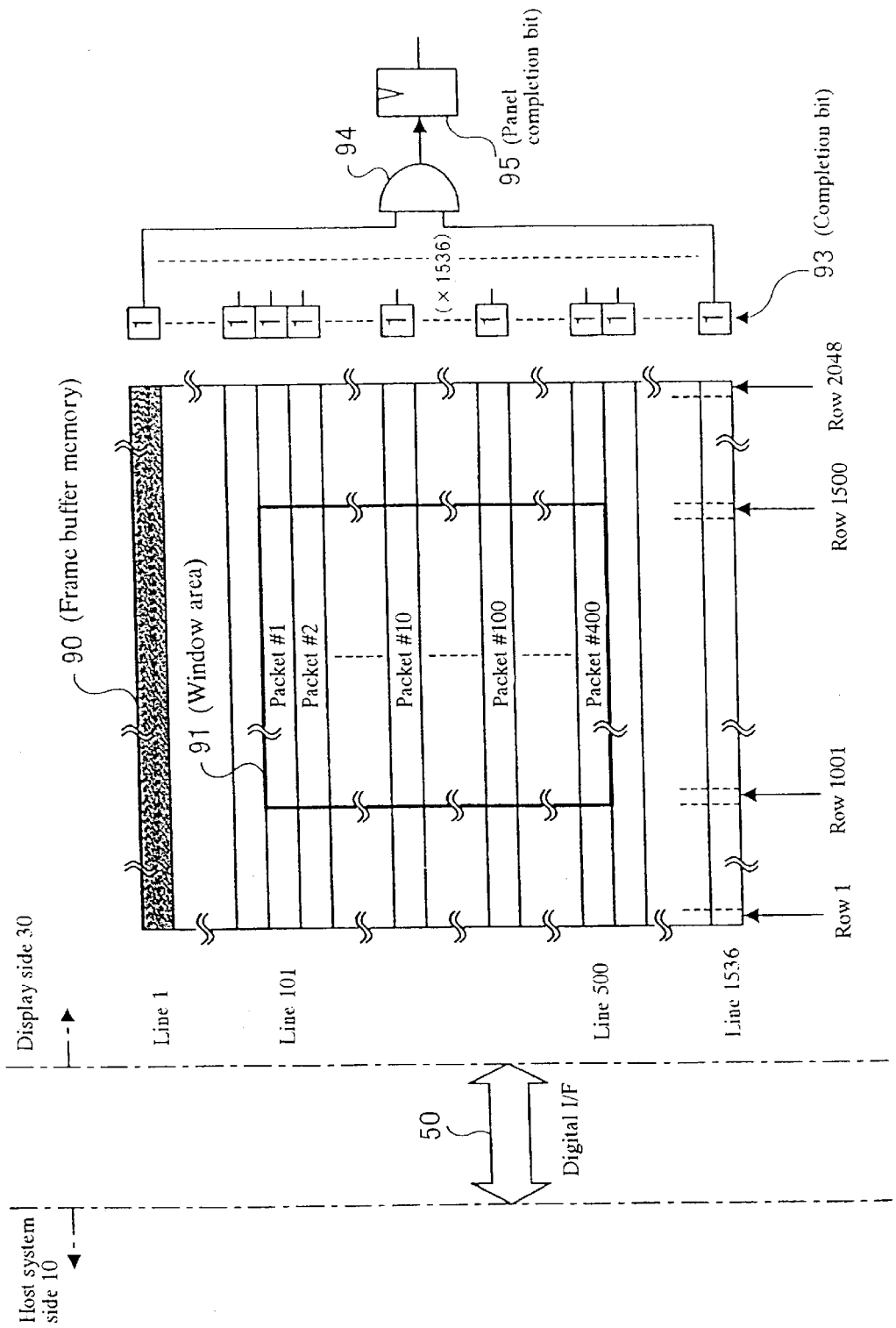

[Figure 11]
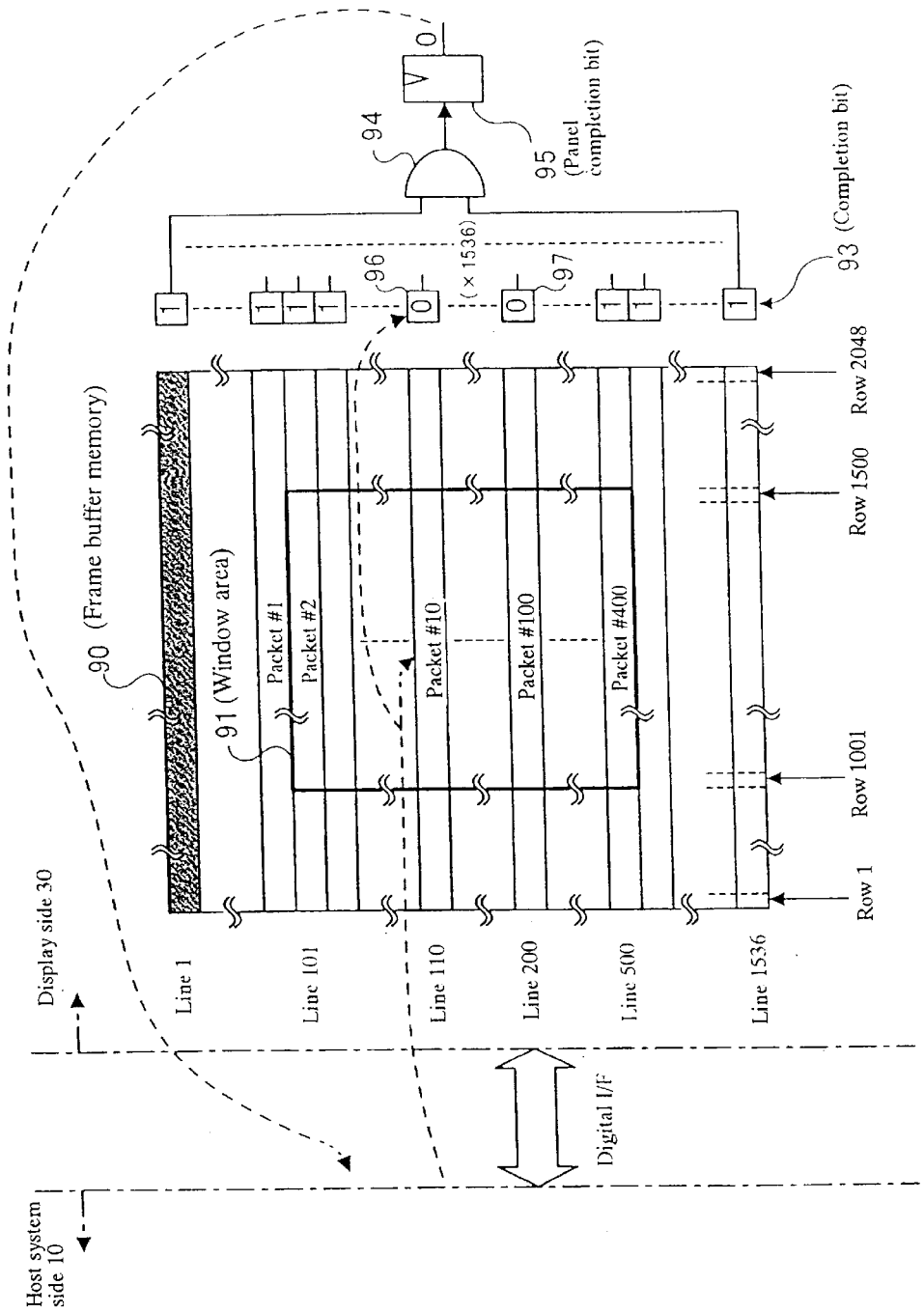

[Figure 12]
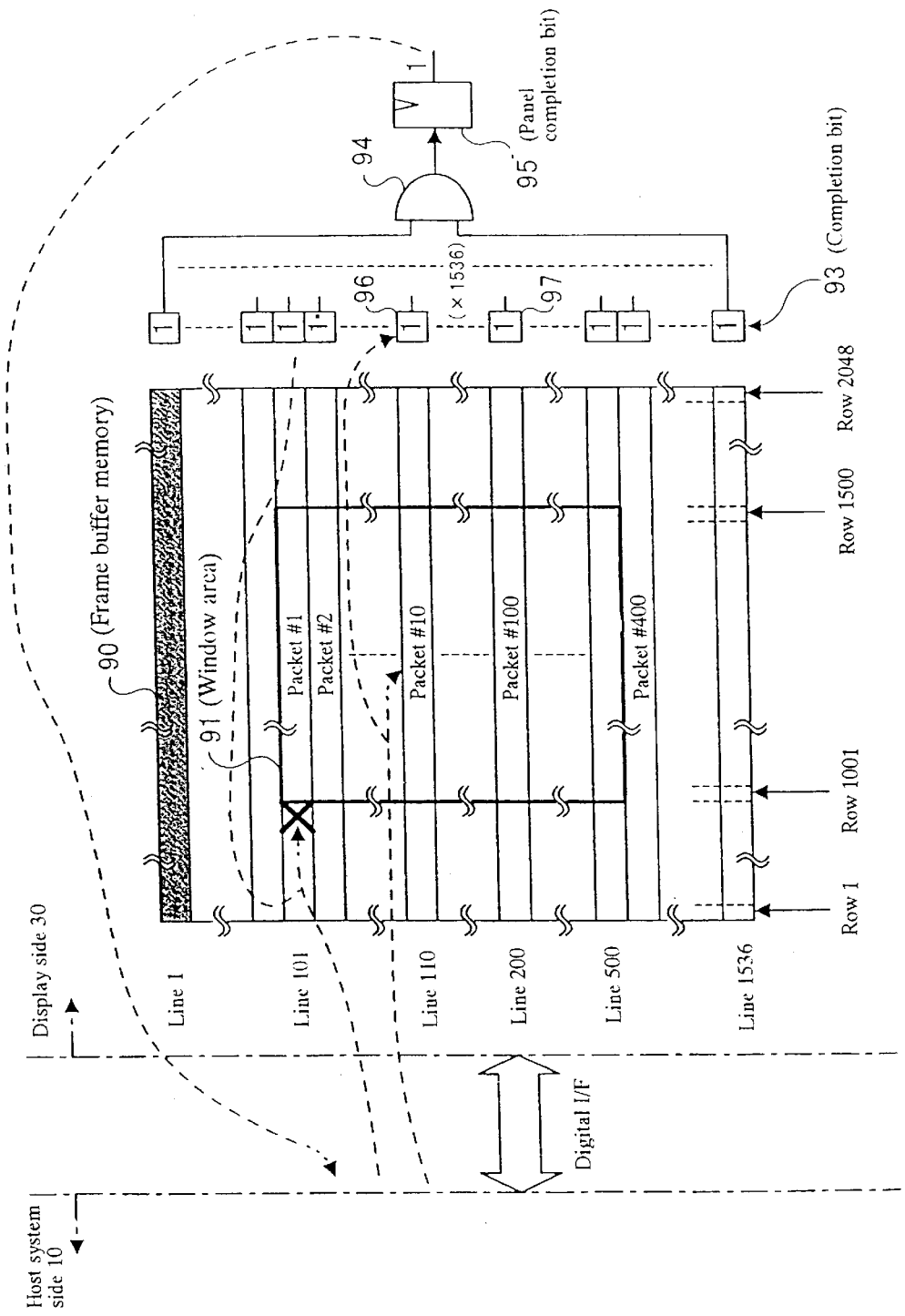

[Figure 13]
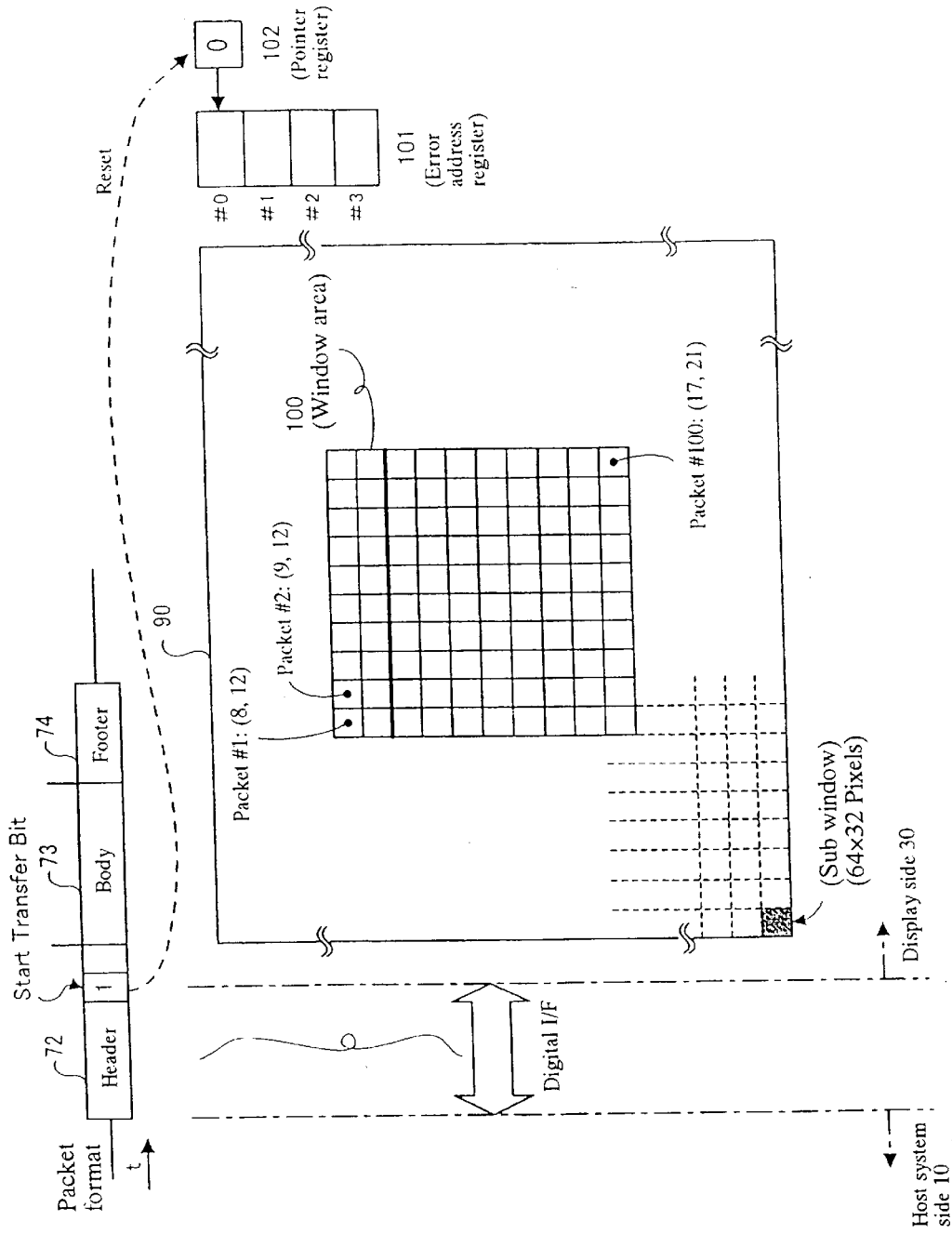

[Figure 14]
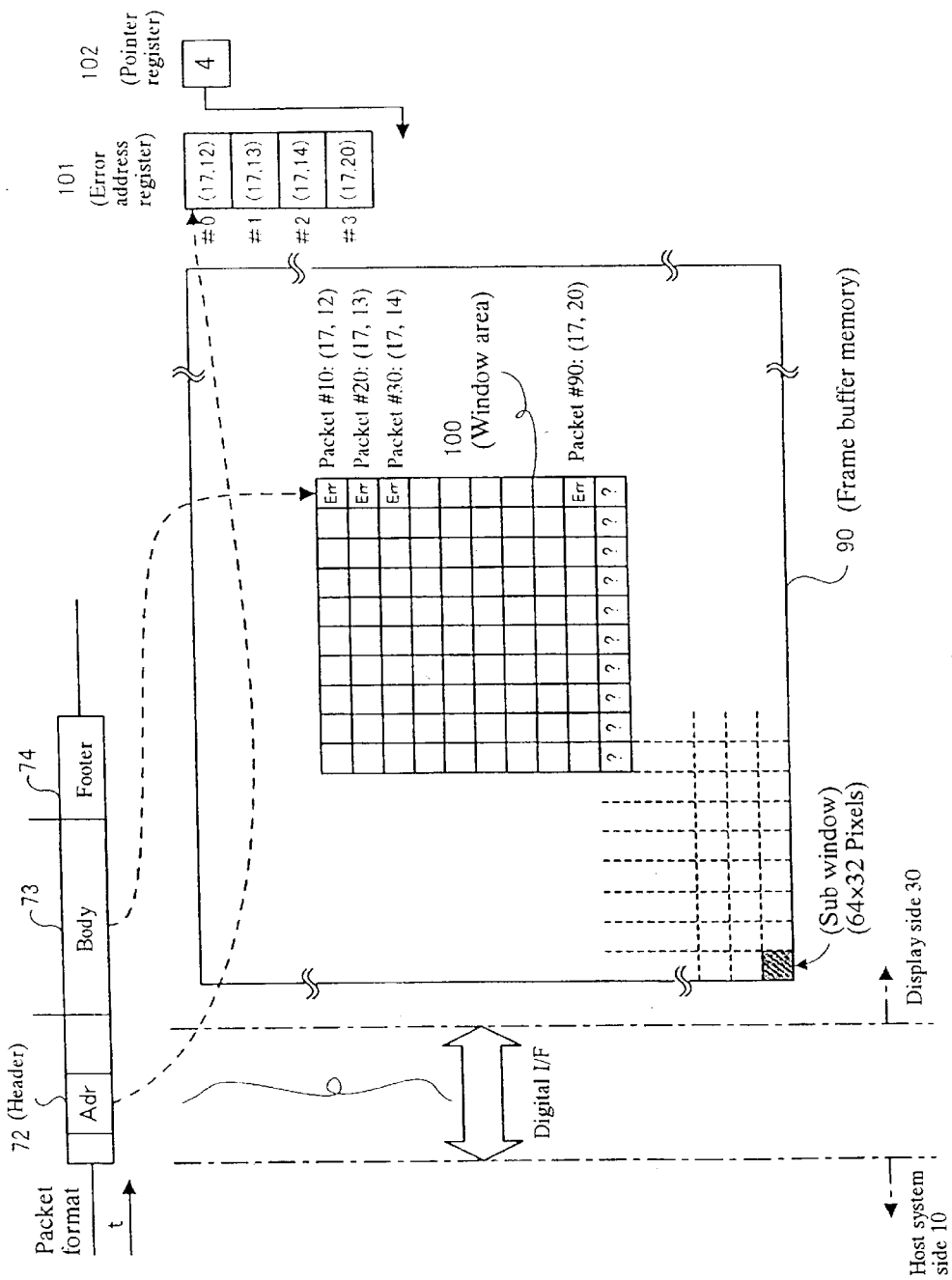

[Figure 15]
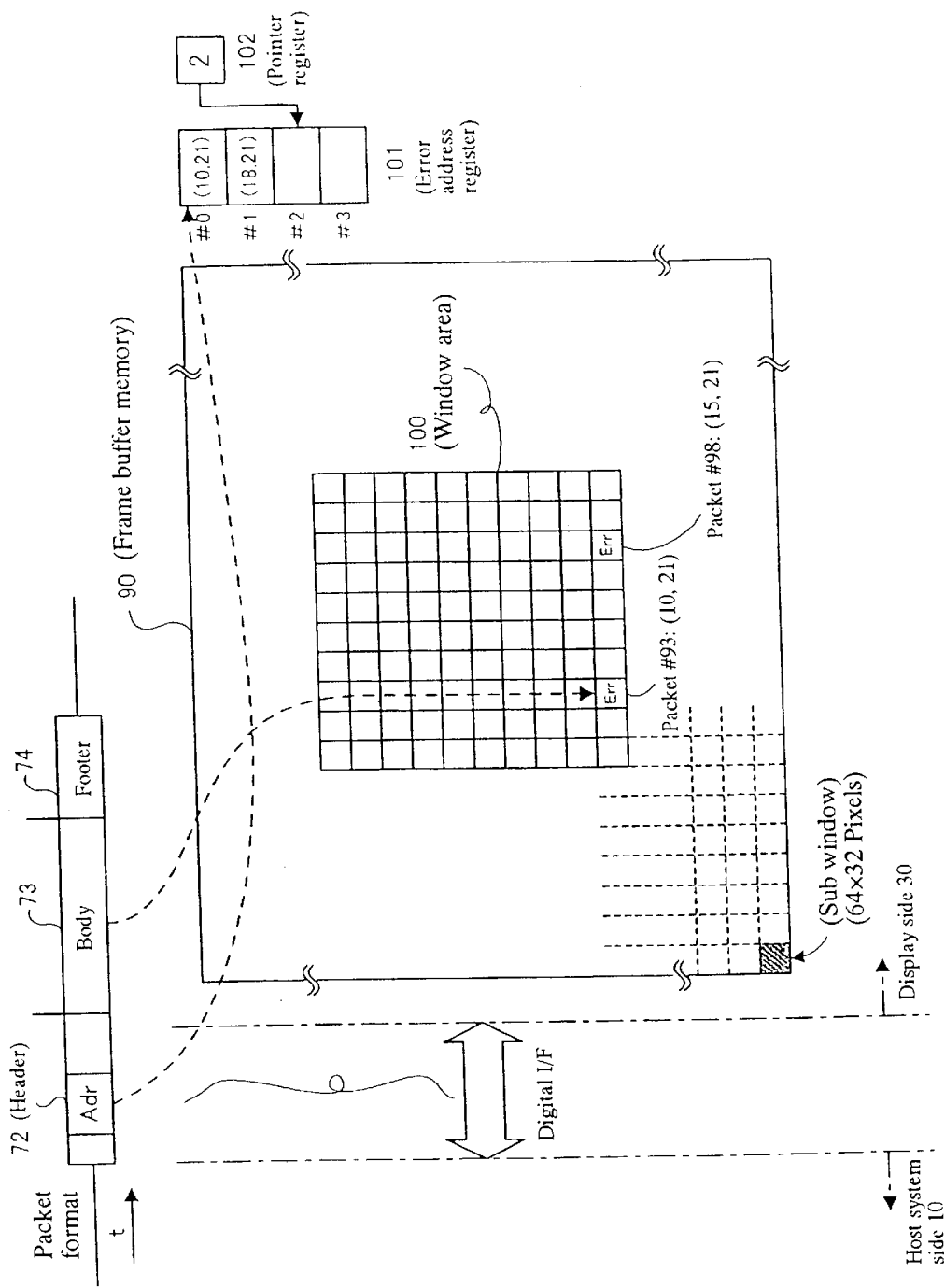

[Figure 16]
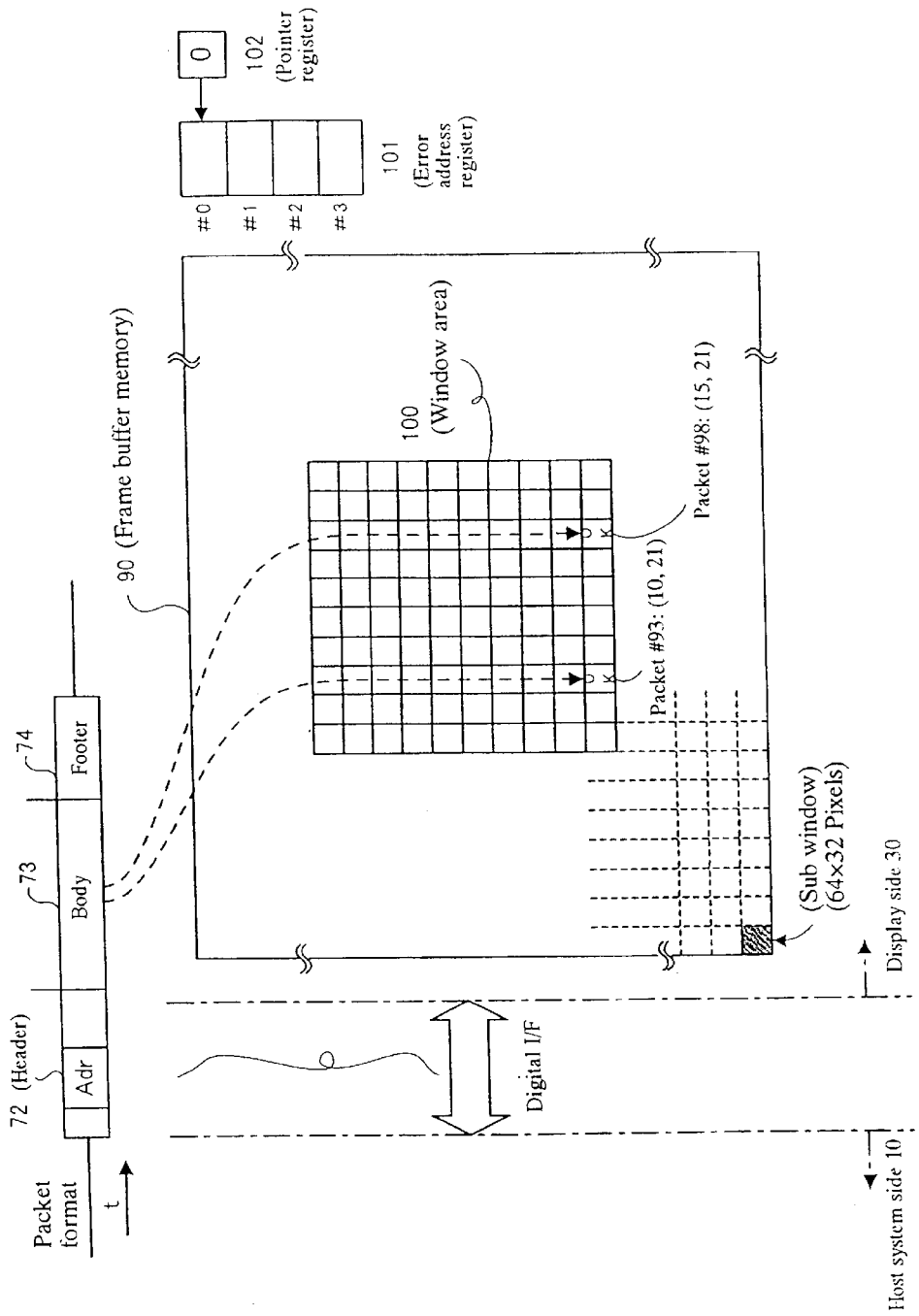

METHOD FOR DISPLAYING IMAGE, IMAGE DISPLAY SYSTEM, HOST SYSTEM, IMAGE DISPLAY APPARATUS, AND INTERFACE FOR DISPLAY

FIELD OF THE INVENTION

The present invention relates to a video interface mechanism used for displaying an image on a display panel, more particularly to a method for displaying an image, a host system, a display apparatus, etc. used for driving a plurality of display panels and high definition panels through a distributed processing.

BACKGROUND OF THE INVENTION

Generally, an image is transferred to a display apparatus after it is processed by a graphics controller included in a host system, like a personal computer (PC). However, due to the progress of display apparatuses, such as the active matrix liquid crystal display (AMLCD) panel that has appeared in recent years, many different processing systems have appeared between host system and display apparatus. For example, in the case of such LCD panels that have a higher resolution and pixel count, there are super-high definition LCD panels whose resolutions and pixel counts are very high like QXGA (Quad Extended Graphics Array) (2048× 1536 dots), QSXGA (Quad Super Extended Graphics Array) (2560×2048 dots), QUXGA (Quad Ultra Extended Graphics Array) (3200×2400), etc. In addition, such display apparatuses as LCD panels are have smaller and smaller in-frame screen, so as to enable so-called tiling that groups a plurality of panels into an extended panel. As a result, in the display apparatus, a resolution can be increased to form a super-high definition panel.

And, now that the resolutions of those panels are improved significantly as described above, prior system powers and graphics controller powers cannot keep up with the progress of those panels. Consequently, it is impossible now to display image data satisfactorily on such super-high definition panels and multiple panels.

For example, the performance of such an image processing system as a graphics controller with general display functions is limited to QXGA or so. For such three-dimensional (3D) computer graphics (CG) as home video game machines, its processing capacity is as low as VGA (Video Graphics Array) (640×480 dots) in resolution. As described above, therefore, although the resolution of the latest dynamic picture images is VGA or so, LCD panels are manufactured so as to cope with resolutions several times to several tens of times that of the VGA. And accordingly, a significant difference has become apparent in processing capacity between host system and display apparatus.

And, if, when video data transferred from a host PC (host side) is displayed on a super-high definition display panel, the display panel attempts to keep the same frame rate as that of the host PC, then the transfer rate in the video interface must be increased in proportion to the high resolution of the display panel. On the other hand, in recent years, the video interface between a host PC and a display panel is rapidly shifted from the conventional analog interface to a so-called digital interface that employs a low voltage driving type digital data transmission method referred to as the LVDS (Low Voltage Differential Signaling), the TMDS (Transmission Minimized Differential Signaling) and the GVIF (Gigabit Video InterFace). Consequently, the transfer clock of this digital interface is improved and the number of signals of the video interface is increased to double (Dual Channel) and 4 times (Quadruple Channel), thereby enabling their transfer rates to be increased.

However, those methods have been confronted with a problem that each time a new super-high definition display panel appears, the transfer rate must be updated to its required one. Concretely, it is required that a new video interface timing is defined, a new LSI is developed so as to cope with the high transfer clock rate, and a new multiple channel structure is employed for the video interface signals in accordance with such a new display panel. It has also been required that those new items are added to such video interface standards as the VESA (Video Electronics Standard Association), etc. Those problems are not eliminated as long as the methods stick to those conventional video interface techniques. And, in order to solve those problems fundamentally, a video interface must be developed on the basis of a concept completely different from any of those conventional video interfaces.

Under such circumstances, this applicant has proposed a video interface as disclosed in Japanese Patent Application No. 11-341462. The disclosure describes a technique that enables distributed processings of an image between the host system and the display, where packetized video data is transferred. The amount of transfer data is reduced with respect to a transfer error detected in the data part.

According to the conventional techniques as described above, ACK (Acknowledge) and NACK (Not Acknowledge) are generally used to confirm sending/ receiving of data during a transfer of packetized data. This ACK/NACK is returned as a confirmation answer from the receiver in response to each received packet. ACK is returned to the transmitter in response to correct receiving of a packet. Otherwise, NACK is returned to the transmitter. If, when transferred packetized video data is to be displayed on a panel (display side), video data is refreshed and transferred continuously, then neither ACK nor NACK is required. This is because video data is transferred again just after a transfer error if such a transfer error occurs. However, if display data is kept as is, the transfer cannot be stopped even in an error-free state. Thus, video data cannot be displayed normally unless it is rewritten. If an error occurs, therefore, the error must be notified with ACK/NACK, etc. For example, in the asynchronous sub-action transfer mode, which is a typical packet transfer mode of the IEEE1394 Standard, a bus master that has occupied a bus through an arbitration, after transferring an asynchronous packet to a slave bus target, must read back the acknowledge packet in a predetermined time gap. If such a transfer method is employed, it is possible to notify the host system of each error state. However, the average data transfer rate from the same bus master is degraded significantly at this time.

The Japanese Patent Application No. 11-341462 also describes the handling of an error that occurred in a data part during a packet transfer in an interface using neither ACK nor NACK or very slow ACK and NACK. According to the disclosure, it is possible to handle an error that occurred in a data part with efficiency. The transfer of mass image data included an added ID from the host system. In this case, however, it is impossible to recognize an error-occurred packet (a header ID transfer error) correctly when the system has a plurality of display panels. If such an ID error occurs, the packet may disappear before the error-occurred packet is identified.

Assume now that, for example, each line data is packetized and transferred. If an error occurs in the ID of a packet, then the address in the vertical address is increased sequentially so as to calculate a write address automatically. In such a case, the screen is deviated by one line from the error-occurred line. In addition, when image data is written at random, the data might not be written. Especially, if a plurality of display panels are used, it is impossible to identify the object display panel to process. Thus, there is no way for processing the error-occurred packet.

Under such circumstances, it is an object of the present invention to solve such the conventional technical problems and enable distributed processings to be made both at the system side and at the display panel side in such an advanced system as a super-high definition (QXGA, QUXGA, etc.) panel and a multiple panel and in a system for displaying information including text, image data, etc., thereby bringing out the maximum display processing ability.

It is another object of the present invention to enable transfer error handling by recognizing a transfer skip while image data is transferred from the host system.

It is still another object of the present invention to detect a transfer error occurred in the header of a packet including the ID easily during a transfer of packetized data from the host system to the display panel.

SUMMARY OF THE INVENTION

In order to achieve the above objects, the present invention includes a feature for displaying an image transferred from a host system that executes an application program to an image display connected to the host system via an interface. According to a method of the present invention, the host system controls a group of image data belonging to a window according to a sub window, which is a division of the window on the display. The window is an area meaningful as a whole in an image space recognized by the application. A group of the image data controlled by the host system is packetized and order information denoting the order of this packet is added to the packet to be transferred to the display via the interface. Image data transferred via the interface is developed in a panel memory of the display and a packet skip is detected according to the order information, thereby the host system can know via the interface the state of the packet skip detected by the display.

Furthermore, the present invention can be characterized by re-transferring image data from a host system to a display via an interface according to the state of a packet skip known by this host system.

Another feature of the present invention also provides an image display system that includes a host system for executing an application program, a display connected to this host system, and an interface for connecting the host system to the display and used to display an image on the display. This interface enables packetized data including ID information to be transferred from the host system to the display. The interface is composed of a first interface for transferring packetized data together with packet order information and a second interface for enabling less data than the capacity of the first interface to be transferred from the display to the host system together with information of a packet transfer error recognized according to the order information.

The image display system of the present invention, when looked from another viewpoint, comprises a host system that controls a group of image data belonging to a window according to a sub window, which is a division of the window meaningful as a whole in an image space recognized by an application program. A display is connected to this host system and is used to display an image. An interface for connecting the host system to the display is also included. In this image display system, the host system packetizes a group of image data and transfers the packetized image data to the display via the interface. At this time, the packetized image data is added with an ID for distinguishing a window from others and count information to be counted up for each transferred ID. This display, provided with a counter counted up for each transferred packet, enables image data included in each packet transferred from the host system via the interface to be developed in its panel memory. The display also compares this counter value with the counter information included in each packet so as to recognize a transfer error.

Still another feature of the present invention includes a host system used to execute application program and is connected, via an interface, to a display that displays an image. The host system is characterized so as to have an order information setting device for allocating order information to each window, which is a display area meaningful as a whole in an image space recognized by the application program; and an image data transferring device for transferring image data divided for each predetermined sub window belonging to a window to the image data. The image data is added with order information allocated by the order information setting device.

Yet another feature of the present invention is to provide an image display apparatus. The image display apparatus of the present invention comprises a panel for displaying an image; a receiving device for receiving packetized data including count information from a host system that executes an application program via an interface; a counter for counting packetized data received from this receiving device sequentially; a comparing device for comparing the counter value with the count information included in the packetized data received from the receiving device; and a detecting device for detecting a transfer-error-detected packetized data according to a result of the comparison result executed by this comparing device.

Finally, the present invention also provides an interface for the display. The display interface is dedicated to a display for packetizing image data to be transferred to each predetermined sub window belonging to a window, which is an area meaningful as a whole in an image space recognized by an application. The packet can comprise a header including information of a window to which the packet belongs and the packet count information, a body including image data belonging to a sub window on the display, and a footer including information for confirming a transfer error.

BRIEF DESCRIPTION OF THE DRAWINGS

FIG. 1 is a block diagram of an image display system in an embodiment of the present invention.

FIG. 2 shows an image data transfer method that uses packets employed in the embodiment of the present invention.

FIG. 3 shows the contents of a handler provided in a display 30.

FIG. 4 shows a block diagram of a physical configuration of a video interface in the embodiment of the present invention.

FIG. 5 is a block diagram of another physical configuration of the video interface.

FIGS. 6(a) and (b) show physical configurations (formats) of a data transfer in the embodiment of the present invention.

FIG. 7 shows a configuration of the header of a packet for handling an error.

FIG. 8 shows a processing flow in the host system 10.

FIG. 9 shows a processing flow in the display 30.

FIG. 10 shows how a transfer error is handled in a specific format.

FIG. 11 shows a transfer error occurred after a transfer of image data to a window area 91.

FIG. 12 shows how a re-transfer sequence has been executed.

FIG. 13 shows another transfer error processing.

FIG. 14 shows the state of a transfer error occurred during a transfer of data to a window area 100.

FIG. 15 shows the state of a transfer error occurred during a re-transfer operation.

FIG. 16 shows how a transfer sequence is ended after twice re-transfer operations.

DETAILED DESCRIPTION OF THE INVENTION

More concretely, the image data to be re-transferred in such a case is the image data for every sub window belonging to a window. If the present invention is characterized so that such image data is re-transferred to the panel memory of the display only with respect to a sub window in which this packet skip occurs at this time, then it is possible to reduce the error information to be known by the host system, thereby even the host system provided with a less interface capacity can handle such a transfer error.

This re-transferring of image data can be characterized so as to be done to a sub window in which a packet skip is detected. In such a case, the number of packets to be re-transferred can be reduced, although the error-detected sub window identifying information must be transferred to the host system. This is a great advantage.

In the present invention, the order information is order counter information stored in the header of each packet. And, if the display is characterized so as to detect a packet skip according to the counter information of its own order counter, it would be advantageous for the display provided with the minimum information (the order counter) to recognize a skipped packet according to an error detected in the header of the packet. Adding a packet ID consisting of packet chain information (position information), etc. may be used as another form of such the order information instead of the order counter.

A feature of the host system includes transfers image data that is not developed yet to the display via the first interface. The display, provided with a panel memory used to develop image data transferred from the host system via the first interface, transfers the image data developed in this panel memory together with transfer error information to the host system via the second interface.

The display also has a plurality of handlers used to process image data for each window ID respectively. If a counter is provided for each of those handlers it will be possible for each handler that processes each window ID to be able to recognize transfer errors.

Since image data is packetized before it is transferred. If order information allocated by the order information setting device is count information counted up for each window each time the packetized data are transferred, then it would be advantageous to detect a data transfer skip only by adding the minimum information (count information) to each packet.

The image data transferring device adds a window ID to each image data to be transferred, separately from the order information.

Furthermore, the host system is also provided with a receiving device for receiving the state of a transfer error identified from this order information from the display. If the image data transferring device is characterized so as to re-transfer image data according to the state of a transfer error received by this receiving device, then the host system can process the error even when no change occurs in display data on the display.

This host system may be composed of a personal computer (PC) that includes, for example, an optional card or uses a semiconductor chip for realizing such the card function. The program in the PC may be updated so as to realize the card function in a software manner.

If the image display apparatus is further provided with a notifying device for notifying the host system of a transfer error in packetized data detected by the detecting device and this receiving device is characterized so as to receive packetized data re-transferred from the host system, then it will be possible for the image display apparatus to handle the error even when consecutive image data is not refreshed before it is transferred. This notifying device may be composed so that the host system reads such a transfer error by itself or the image display transfers the transfer error.

Furthermore, if the image display apparatus is also provided with a frame buffer memory for developing image data from packetized data received by the receiving device and transferring the image data to a panel and the receiving device receives re-transferred packetized data by avoiding development of image data in the frame buffer memory if a transfer error is detected in the packetized data by this detecting device, then the image display apparatus can be composed so as to develop image data in the frame buffer memory according to the re-transferred packetized data. It is also possible to compose the image display apparatus so as to develop all the packetized data into the frame buffer memory at the first transfer and rewrite re-transferred packetized data.

In another configuration, the image display apparatus of the present invention comprises a receiving device for receiving image data from the host system that executes an application program as packetized data divided for the predetermined unit of an image space recognized by the application program; a panel memory for developing image data consisting of packetized data received by this receiving device sequentially; a panel for displaying an image according to the image data developed in this panel memory; and a transfer skip notifying device for recognizing the transfer skip of the packetized data received by the receiving device and notifying the host system of information about a transfer skip recognized in units of image data developed in the panel memory. Because a transfer skip is notified to the host system in units of image data developed in the panel memory in such a way, the processing is advantageous in that ACK and NACK may be omitted in exchanges of data, although ACK/NACK is indispensable in normal exchanges of data. The transfer skip notifying device may be composed as described above; the host system may read such the transfer skip by itself.

The image display apparatus may also be characterized so as to further have a register for storing information of packetized data in which a transfer skip is detected and enable the transfer skip notifying device to notify the host system of the transfer skip information according to the information of the packetized data stored in the register. The register, if it is composed of hardware for denoting a packet address, etc., will be favorable in that it is possible for the panel to re-transfer only a packet in which a transfer skip is detected. On the other hand, the register may also be composed so as to notify the host system only of an actually detected transfer skip. Consequently, this register may also be composed so as to store information of an actually detected transfer skip.

Furthermore, a header can also include information for identifying whether or not the object packet is for re-transferring image data. According to those display interfaces, it is possible to transfer packetized image data from the host system before it is developed. In addition, it is possible to recognize a packet transfer error at the display side by transferring the packet together with the count information.

According to the present invention it becomes possible to recognize a transfer error that occurred in the header (including its ID) of each packet easily during a transfer of packetized image data from a host system to a display.

Hereunder, the preferred embodiments of the present invention will be described in detail with reference to the accompanying drawings.

FIG. 1 is a block diagram of an image display system in an embodiment of the present invention. In FIG. 1, reference symbol 10 denotes a host system (HOST) composed of a personal computer (PC), etc. The host system functions as a driving apparatus for driving the display apparatus in this embodiment. At the side of the host system 10, reference symbol 11 denotes a graphics controller. A pre-processor (not illustrated) provided in the graphics controller 11 pre-processes image data. Reference symbol 16 denotes a graphics memory used for the pre-processing of image data. In this embodiment, the graphics memory 16 is composed with a less capacity than conventional ones. This is because the distributed processing of the graphics controller 11 in this embodiment can omit continuous refreshing of image data. Reference symbol 17 denotes a system bus connected to the host system (not illustrated) for executing an application program. Reference symbol 12 denotes a transmitter used to transfer image data received from the graphics controller 11 to a display 30.

Reference symbol 50 denotes a digital interface (digital I/F), which is LVDS, TMDS, or the like for enabling image data to be transferred to the display 30 from the host system 10. This digital I/F 50 is defined as a fast uni-directional video interface. Reference symbol 60 denotes a control signal line, which is such a slow bi-directional transfer line such as a DDC (Digital Data Channel). This control signal line 60 connects a DDC handler (not illustrated) provided for the graphics controller 11 to a DDC controller (not illustrated) provided for each panel control chip (to be described later) of the display 30.

On the other hand, at the side of the display 30, reference symbol 35 denotes a plurality of panel control chips provided with a post-processor (not illustrated) respectively therein. The number of those panel control chips 35 is decided in accordance with the number of divisions (four division in FIG. 1) of the panel 40 for displaying an image actually. Reference symbol 36 denotes a panel memory provided for each panel control chip 35. Reference symbol 31 denotes a receiver for converting image data transferred from the host system 10 via the digital I/F 50 and transfers the converted image data to a panel control chip 35. Reference symbol 40 denotes a panel for displaying an image actually. In FIG. 1, the panel is divided into four areas (sub windows) so as to be controlled. This panel 40 is composed of a high definition panel. In order to support this high definition panel 40, a plurality of panel control chips 35 are disposed so as to enable parallel processings of image data.

In this embodiment, the configuration of the image display system is characterized so as to enable the graphics controller 11 to pre-process image data and the panel control chips 35 to post-process the image data. Consequently, the display apparatus 30 can execute such screen generating jobs as mixing of image data so as to refresh the screen, although the jobs have been executed in the graphics controller 11 at the host system 10 side. Concretely, a tag, an attribute, and an error prevention are provided for image data before it is developed in the graphics controller 11, that is, before it is mixed with others. And, after that, the image data is developed in the panel memory 36 by the panel control chips 35. More concretely, the image data is expanded so as to be mixed with others and transferred to a refreshing circuit (not illustrated).

In this embodiment, a concept of "window" is employed. This "window" is an area meaningful as a whole in an image space recognized by the host system 10. It is a unit for transferring image data.

FIG. 2 shows an image data transfer method that uses the packets employed in this embodiment. The description of the image data transfer method is simplified with respect to the above described window. It is assumed that the application program in the host system 10 recognizes image data in two areas A and B. In this embodiment, the host system 10 does not develop image data, but the display 30 develops image data. At the host system 10 side is set, for example, a window ID=4 for the area A and a window ID=5 for the area B. Image data to be transferred to the display 30 is packetized for each of those areas A and B. More concretely, packetized image data signals are transferred to each area belonging to such a sub window (to be described later), for example, in each scanning in response to the Display Enable signal. This sub window may be a rectangular area consisting of the predetermined number of pixels. Each of those packetized image signals is added and transferred with ID information for denoting its corresponding window.

FIG. 3 shows contents of a handler provided in the display 30. The handler mentioned here is a processing unit for processing a window. In FIG. 3, for example, two handlers are provided in one display 30. The first handler 41 and the second handler 42 are assumed to be set so as to process a window (ID=1) and a window (ID=3) respectively. Image data from the host system 10 is packetized and added with a window ID respectively. Each of the first and second handlers 41 and 42, when deciding a target window according to the window ID set in the object packet, executes the processing and updates the display space on the screen 43 of its panel 40. In FIG. 3, the window (ID=2) is not processed. Consequently, the display 30 is composed so that setting of the first handler 41 or the second handler 42 is changed as needed so as to specify the processing of the window (ID=2), then packets having a window ID=2 are sent out. The number of handlers is optimized in consideration of the number of windows necessary for concurrent processing processings of image data. If a plurality of panel control chips 35 are used for processing one panel 40 shown in FIG. 1, then the handler of each panel control chip 35 is composed so as to have a common window ID. In the same way, if the panel 40 is tiled, all the tiled portions of the panel 40 have a common window ID.

Assume now that video data is transferred to the display 30 (or a group of many connected display panels) from a PC system, etc. in the host system 10 side. In this case, mass of video data will be transferred from the host system 10 to the display 30. On the other hand, when video data is transferred from the display 30 to the host system 10 (when the host system 10 reads data), each display ID and each data transfer error will be checked. Generally, although the data amount to be transferred is far less than the former case, the data amount cannot be 0.

In this embodiment, a packetized video data interface is provided so as to solve such the problem. The interface is effective enough to transfer mass of data from the host system 10 to the display 30 and also from the display 30 to the host system 10, although the amount is small in this transfer in the reverse direction.

FIG. 4 is a physical block diagram of this video interface in an embodiment of the present invention.

In the host system 10, the transmitter 12 is provided with an encoder/serializer 13 and a PLL (Phase Locked Loop) 14. This encoder/serializer 13 converts image data from parallel to serial and passes the converted serial image data to the digital I/F 50. This PLL 14 generates a multiplied clock used to convert image data from parallel to serial.

At the display 30 side, the receiver 31 is provided with a decoder/deserializer 32 and a PLL 33. The decoder/deserializer 32 converts image data from serial to parallel. The PLL 33 generates a multiplied clock used to convert image data from serial to parallel.

The digital I/F 50 is provided with a uni-directional fast transfer line 51 and a uni-directional transfer line 52. This uni-directional transfer line 52 transfers a clock signal output from the host system 10. The uni-directional fast transfer line 51 is provided with a plurality of data signal lines and transfers image data output from the host system 10 synchronously with the clock transferred from the uni-directional transfer line 52.

On the other hand, the control signal line 60 is provided with a bi-directional slow transfer line 61 and a clock signal line 62. Panel ID information, error information, etc. are transferred from the display 30 to the host system 10 via this bi-directional slow transfer line 61.

FIG. 5 is a block diagram of another physical configuration of the video interface. This physical configuration is characterized in that only the data lines of such a uni-directional differential type video interface as the conventional LVDS, TMDS, etc. is set as bi-directional lines so as also to be used for data transfer from the display 30 to the host system 10. This point is only a difference from the configuration shown in FIGS. 1 and 4.

In FIG. 5, the host system 10 is provided with a transmitter/receiver assembly 19 and the display 30 is provided with a transmitter/receiver assembly 39 respectively. A digital I/F 55 is provided with a unidirectional fast transfer line 56, as well as two or more bi-directional fast transfer lines 57. In this case, a clock signal line 65 is kept as a uni-directional line used to multiply the clock signal at a PLL 14 and a PLL 33, thereby generating a fast clock signal. This bi-directional fast transfer line 57 transfers serial image data converted from parallel data from the host system 10 to the display 30 at a fast clock rate synchronized with this multiplied clock. Panel ID information and error information can be transferred from the display 30 to the host system 10 by feeding back the clock signal as it is to one of the bi-directional fast transfer lines 57 and using another bi-directional fast transfer line 57 for transferring object data to read. The graphics controller 11 is provided with a latch 15 for latching status information read from the display 30 to adjust the timing between them. Also, a latch 34 is provided on the side of the display 30, which latches status information read from the host system 10.

In the case of the video interface shown in FIG. 5, part of the conventional differential type interface must be expanded to cope with bi-directional transfers as described above. However, the video interface shown in FIG. 5 is still advantageous in that such a slow bi-directional transfer line as a DDC is not needed. Usually, if such the differential type interface is modified to a bi-directional one simply, the clock line must also be modified to a bi-directional one and two types of the PLLs 14 and 33 are required so as to cope with bi-directional transfers. The PLLs 14 and 33 are used to generate a multiplied clock for parallel-serial conversion. In this embodiment, however, it is premised that the amount of data to be transferred from the display 30 to the host system 10 is far less than that to be transferred in the reverse direction. This is why one of the data lines (digital I/F 55) is used to feed back the clock signal from the host system 10 to the display 30 and another data line is used to transfer data from the display 30 to the host system 10. With such the configuration, the uni-directional clock signal line can be kept as it is, thereby it is no need to provide the display 30 with a clock source so as to make it the bus master. Thus, the host system 10 can become the bus master so as to control reading of data transferred from the display 30 to the host system 10. And, because less data is transferred from the display 30 to the host system 10, parallel-serial conversion of data can be omitted for transferring of data in this direction. Therefore, no extra PLL is needed.

The data transfer rate, when data is transferred from the host system 10 to the display 30, is decided by the resolution of the object panel to be supported in real time by the video interface. Assume now that the video interface can support an SXGA (1280×1024 dots) 8-bit color panel at a refreshing rate of 60 Hz. Because each of R, G, B uses 8 bits, the number of the total required bits becomes 24 bits and the pixel clock is 110 to 120 MHz. The data transfer rate will thus be calculated as shown below.

24×110M/8=330 MBPS(bytes/sec)

24×20M/8=360 MBPS

The result will thus be around 330 MBPS to 360 MBPS. Generally, the order becomes around 100 MBPS to 1 GBPS.

On the other hand, when data is transferred from the display 30 to the host system 10, one bit is needed for the first mechanism and 5 to 10 bytes are needed for the second mechanism per transfer of one window respectively as to be described later only to confirm the error state in this embodiment. Even when reading of other information is included, at most 20 to 30 bytes are needed per refreshing of one frame (60 Hz). Consequently, the transfer rate will become around 1.2K to 1.8K BPS because 20×60=1200 and 30×60=1800 are assumed.

Consequently, the ratio between both transfer rates become about 100,000:1 to 1,000,000:1. This embodiment can therefore cope with both large capacity and small capacity data transfers.

FIG. 6(a) and (b) show logical configurations (formats) of data transfer in the embodiment. In this embodiment, a digital I/F 50 or 55 is used to transfer packetized image data from the host system 10 to the display 30.

In FIG. 6(a), both packet enable signal 70 and packetized data 71 are transferred via the uni-directional fast transfer lines 51 and 56, as well as via the bi-directional fast transfer line 57 synchronously with the clock transferred to the uni-directional transfer line 52 and the clock signal line 65.

The specifications of the TMDS enable a total of 30 bits (10 bits for each of R, G, and B) to be transferred. In the case of the conventional video data transfer, the R(Red)/G (Green)/B(Blue) video data, the V-sync and H-sync signals, the DE signal denoting data valid, and other two control signals or so have been serialized and sent out. In this embodiment, however, the specifications of this TMDS are employed to secure one bit for the Packet Enable signal 70 and 24 bits for packetized data 71. This Packet Enable signal 70 denotes a valid period of packetized data 71. The use of this Packet Enable signal 70 enables undefined length packetized data 71 to be transferred.

Each packetized data 71 consists of a header 72, a body 73, and a footer 74.

The header 72 includes a window ID 86 for denoting the ID of an object window of the transfer, a start transfer bit 79 for identifying whether or not the packet is a re-transferred one, and a sync data bit 80 for denoting that the frame is a new one. The header 72 also includes a reset bit 81 for denoting that the order counter is reset and an error counter 82 for denoting a value of the order counter of the host system 10. Furthermore, the header 72 includes a sub window address field 75 and a check byte 87 consisting of a parity, a SUM, a CRC (Cyclic Redundancy Check), etc.

The body 73 includes a video data field (Video Data) 76 for transferring image data actually and an attribute field (Attr Field) 77. In this embodiment, as described above, a window is defined as an area meaningful as a whole in an image space recognized by the object application program in the host system 10, then image data is transferred in units of such a window. Concretely, image data in this video field 76 is transferred within a range defined in a window, for example, line by line. In addition, the attribute field 77 stores such information as address information of a more detailed sub window (to be described later), video data within a sub window, and information of a scaling factor, etc.

A sub window means an area, which is one of the equal divisions of the total screen of the panel 40. For example, the sub window is one line or one rectangular area. Video data to be transferred in a packet is displayed in a given one of those sub windows. Concretely, the maximum number of video data items to be transferred in a packet is for all the pixels in one sub window. The minimum number of video data items to be transferred in a packet is for one pixel.

The footer 74 includes a parity bit, an ECC (Error Checking Correcting), and a transfer error checking/correcting field 78 for checking a transfer error with use of the CRC.

FIG. 6(*b*) shows the structures of both body 73 and footer 74 shown in FIG. 6(*a*) more in detail. In this embodiment, for example, a 24-bit horizontal parity bit is employed for the transfer error checking/correcting field 78 as shown in FIG. 6(*b*). Video data is divided in units of 24 bits and the same positioned bits in each word are exclusively ORed so as to generate a horizontal parity bit, which is then compared with the value of the transfer error checking/correcting field 78 and those 24 bits are ORed, thereby outputting a parity error of the whole video data. It is thus possible to detect a parity error in video data as described above.

In this embodiment, it is no need to use any special error detecting method if ACK/NACK is used to confirm data exchanges as it is done conventionally when in transferring packetized data. And, for example, when in refreshing such video data as dynamic picture image data continuously, neither ACK nor NACK is needed. However, if, when display data is not changed any longer, image data is developed in the display 30 just like in this embodiment, then the transfer cannot be stopped even in an error-free state. Especially, if the display 30 consists of a plurality of panels and a transfer error occurs in the window ID 86 of the header 72, it is impossible to identify the error-occurred packet. For example, if an error occurs in the window ID 86 of this packet, a problem arises; the screen is deviated by one line from the line if, for example, the address in the vertical direction is increased automatically. In addition, another problem arises; even when an attempt is made to write data at random, the data is not written at all. Especially, when the display 30 consists of a plurality of panels, it is impossible to identify the object panel to process. Thus, there is no way for processing this packet.

FIG. 7 shows a configuration required for handling an error detected in the header 72. If a conventional method for returning error information immediately is employed, it is possible to detect an error in the header 72 with use of detected error information set in the last field of the header 72, as well as with use of a circuit for detecting a parity error, a SUM error, a CRC error, etc. On the other hand, just like in this embodiment, if the up-stream transfer rate is slow and error information cannot be returned immediately, a mechanism for identifying the error-occurred packet is needed separately from a general error detecting mechanism so as to cope with such errors as a transfer skip generated in the header 72 of each packet to be transferred. In this embodiment, therefore, the graphics controller 11 of the host system 10 from which data is to be transferred, is provided with a 2-bit counter 83 that increases its value only by one for each packet transferred. The counter 83 denotes order information of each packet. The bit value from this two-bit counter 83 is written in the error counter 82 of the header 72 of each transferred packet to be transferred. On the other hand, the panel control chip 35 of the display 30, which receives data, is provided with a 12-bit counter 84, which increases its value only by one for each packet received. The panel control chip 35 is also provided with a comparator 85 that compares the lower two bits of this 12-bit counter 84 with the value of the transferred error counter 82 and output an error unless both values match. The 12-bit counter 84 and the comparator 85 may be provided for each of the first and second handlers 41, 42 described above.

FIG. 8 shows a processing flow at the host system 10 side. Hereunder, the processing flow will be described with reference to this FIG. 8 and FIG. 7. At first, the host system 10 resets the 2-bit counter 83 and turns on the reset bit 81 of a packet to be transferred (step 201). At this time, the error counter 82 is reset to "00." After that, the host system 10 turns off the reset bit 81 and stores a value in the error counter 82 to transfer a packet (step 202). The value is increased by one for each packet sent out. The host system 10 knows the number of packets to be transferred for each window and it can thus decide whether or not the transfer of the required number of packets is ended (step 203). If the transfer of the required number of packets is not ended yet, control returns to step 202, where the transfer operation is continued. On the other hand, if the required number of packets are already transferred, the transfer is ended (step 204). Then, the host system 10 reads error information from the display 30 (step 205). If an error is detected, control returns to step 201, where the transfer is repeated again. If no error is detected, the processing is ended (step 207). In this processing flow, if an error is detected, all the packets are re-transferred. However, as to be described later, the apparatus may be composed so as to re-transfer only the error-detected packet.

FIG. 9 shows a processing flow at the display 30 side. This processing flow will be described with reference to this FIG. 9 and FIG. 7. At first, the display 30 detects ON of the reset bit 81 of a received packet and resets the 12-bit counter 84 (step 211). Then, for each packet received, the display 30 increases the value of the 12-bit counter 84 by one (step 212). The lower two bits of the counter value are compared with the value of the counter bit 82 included in the next received packet in the comparator 85 (step 213). The display 30 then decides whether or not both counter values match (step 214). If they match, it is decided that no such error as a packet skip, etc. has occurred. Control thus returns to step 211 so as to continue the operation. If they do not match, the display 30 detects the number of the error-occurred packet (step 215) and stores the packet number in, for example, an error address register 101 (step 216). After that, the value of the 12-bit counter 84 is increased by one (step 217) and control returns to step 211. The apparatus may also be composed so that if all the packets of the object window are re-transferred as described in the re-transfer operation of the host system 10 shown in FIG. 8 at this time, then the error-occurred packet is not written in the memory buffer. In addition, instead of storing the error-occurred packet number, the error bit may be set as to be described later.

Assume now that while 256 packets are transferred to a specific window and an error has occurred in the 47th packet. In this case, the display 30 will detect the error to discard the error-occurred packet. However, this error can also be detected in the 48th packet, which is transferred next. Concretely, while "00" is set in the low two bits of the counter (lower two bits of the 48th packet) of the header 72 of the next packet (48th), "11" (lower two bits of the 47th packet) is set in the low two bits of 12-bit counter 84 of the display 30 that receives data. The "11" is the value just before the "00." Consequently, the display 30 can detect the 47th packet skip.

For example, in the case of the second error handling mechanism to be described later, the display 30 stores an address corresponding to this 47th packet in the error address register 101 and adds one to "48" of the 12-bit counter 84. The value in the register 101 thus becomes "49."

Next, the first error handling mechanism in this embodiment will be described with reference to FIGS. 10 to 12.

In this first mechanism, one line is defined as a sub window, which is a unit for detecting a transfer error.

FIG. 10 shows transfer error handling in the above-described format. Reference symbol 90 denotes a frame buffer memory and reference symbol 91 denotes a window area. This frame buffer memory 90 is provided physically in the panel memory 36 described above. Because a logical configuration for the error processing is described, the frame buffer memory 90 is used. Reference symbol 93 denotes a completion bit (Comp Bit), which is provided for each sub window. In FIG. 10, the completion bit 93 is provided for each line. Reference symbol 94 denotes an AND circuit composed so as to output OFF(=LOW) for each abnormally terminated sub window. Reference symbol 95 denotes a panel completion bit (Panel Comp Bit), which is read from the host system 10. Concretely, in this embodiment, the display 30 is provided with a status bit (completion bit 93) corresponding to a sub window. The status bit denotes the normal termination of a data transfer to a sub window. To generate a status bit (panel completion bit 95) denoting the normal termination of a data transfer to the whole display area, the outputs from all the completion bits 93 are ANDed. After the power ON of each completion bit 93 is reset, the default value becomes ON(=High).

FIG. 11 shows a transfer error occurred after a data transfer to the window area 91. The structure denoted by each symbol in FIG. 11 is the same as that shown in FIG. 10.

FIG. 12 shows an executed re-transfer sequence. The structure denoted by each symbol in FIG. 12 is the same as those shown in FIGS. 10 and 11.

At first, the host system 10 begins transferring of video data so as to update the displayed data in the rectangular area (window area 91) on the display screen. At this time, because the minimum sub window group for covering the area is decided, packetized data 71 for each of the sub windows is transferred sequentially. The display 30 decides the object sub window to which packetized data is transferred according to the sub window address field 75 of the header 72 of each packetized data 71 described above, thereby writing data in the corresponding frame buffer memory 90.

When transferring the first packet to the window area 91, both start transfer bit 79 and sync data bit 80 in the header 72 are turned on. When transferring the second and subsequent packets to the window area 91, the start transfer bit 79 is turned on and the sync data bit 80 is turned off. The sync data bit 80 is used at the display 30 side to detect packetized data transferred to the first sub window of the window area 91 and adjusts the synchronization between the display 30 and the host system 10. The display 30 references to the sub window address field 75 of this packetized data 71, thereby deciding the target sub window to which video data is to be transferred. In addition, the display 30 detects ON of the start transfer bit 79 and turns off (=Low) the completion bit 93 corresponding to this sub window. The display 30 then writes video data included in the body 73 of each packet in the frame buffer memory 90 corresponding to the sub window. At this time, a comparison result is output from the comparator 85 according to the operation of each counter as described with reference to FIGS. 7 to 9. If no transfer error occurs in the header 72, the display 30 turns on the completion bit 93 again. If the counter values do not match as a result of the comparison in the comparator 85, the completion bit 93 is kept off.

After that, when transferring of all the packets for the window area 91 is ended, the host system 10 checks the panel completion bit 95 of the display 30 side.

If the checked panel completion bit 95 is ON, it is regarded that all the packets have been transferred normally. The host system thus exits the transfer sequence for the window area 91.

If the checked panel completion bit 95 is OFF, it is regarded that a transfer error has occurred in a sub window. The host system thus begins a re-transfer sequence for the window area 91.

In the re-transfer sequence, the start transfer bit 79 is turned off in all the packets. When transferring a packet, the host system 10 refers to the sub window address field 75 so as to decide the target sub window to which video data is to be transferred. Detecting OFF of the start transfer bit 79, the host system 10 keeps the status of the completion bit 93 corresponding to this sub window.

Next, if the completion bit 93 is OFF, the host system 10 writes video data included in the body 73 of the packetized data 71 in the frame buffer memory 90 corresponding to the sub window. At the same time, each counter is actuated as described with reference to FIGS. 7 to 9, the comparator 85 outputs a comparison result. At this time, if there is no transfer error detected in the header 72, the completion bit 93 is turned on. If a transfer error is detected in the header 72, the completion bit 93 is kept OFF.

If the completion bit 93 is ON, the host system does not write video data in the frame buffer memory 90 and ignores the result of the transfer error; the host system does not cause the result to be affected on ON/OFF of the completion bit 93.

When transfer of all the packets in the re-transfer sequence is ended, the host system 10 checks the panel completion bit 95 of the display 30 again. If the checked panel completion bit 95 is ON, the host system regards that transfer of all the packets is ended with no error and exits the transfer sequence for this window area 91. If the checked panel completion bit 95 is OFF, the host system 10 repeats the re-transfer sequence again.

Next, the error check and the flow of the re-transfer sequence processing described above will be described again more in detail.

In FIG. 10, it is premised that a sub window is one line on the display screen as described above. In this example, the full display area on the display screen is QXGA (2048×1536 dots) in resolution. The frame buffer memory 90 is expected to cover the whole screen on the display 30. In this case, there are 1536 lines (1st to 1536th) in the vertical direction and 2048 rows in the horizontal direction. And, it is premised that the target window area 91 is a rectangular area within a range between the 101st line and the 500th line in the vertical direction and the 1001st row and 1500th row in the horizontal direction. The first packet for transferring video data to this window area 91 transfers the data of the 101st line and the second packet transfers the data of the 102nd line. The last 400th packet transfers the data of the 500th line. At this time, video data included in the body 73 of each packetized data 71 consists of 500 pixels from the 1001st row to the 1500th row.

FIG. 11 shows a parity error occurred after a data transfer to the window area 91. Assume now that a transfer skip error has occurred in transferring of these 400 packets while the 10th packet (the 110th line) and the 100th packet (the 200th line) are transferred. In this case, at first, the completion bit 96 of the 110th line corresponding to the 10th packet becomes 0 (OFF). The value of the 12-bit counter 84 shown in FIG. 17 is then increased by one and the number of subsequent packets is counted. In the same way, the completion bit 97 of the 200th line corresponding to the 100th packet becomes 0 (OFF). Consequently, the host system 10 can read OFF(=Low) when reading the panel completion bit 95 after the transfer of the last 400th packet is ended.

FIG. 12 shows how a re-transfer sequence is executed.

Recognizing the OFF (=Low) of the panel completion bit 95, the host system 10 begins executing of a re-transfer sequence for the same window area 91. In this re-transfer sequence, the host system 10 transfers 400 packets (the 101st line to the 500th line) again. In this case, however, because the host system 10 has already detected the ON of the completion bit 93 for the packets other than the 110th line and the 200th line, the host system 10 does not overwrite those packets in the frame buffer memory 90. Each "x" mark in FIG. 12 denotes that no overwriting is done. The host system 10, detecting the OFF of each of the completion bits 96 and 97 of only the two packets for the 100th line and the 200th line to be transferred, overwrites those packets in the corresponding frame buffer memory 90. If no transfer error occurs during a transfer of those two packets, all the completion bits 93 are turned ON, thereby the panel completion bit 95 is turned ON. Consequently, the host system 10 can read ON(=High) when reading the panel completion bit 95 after ending the transfer of the last 400th packet in the re-transfer sequence, so all the transfer sequences for the window area 91 are ended.

In the case of the first mechanism described above with reference to FIGS. 10 to 12, one completion bit 93 is provided for a sub window, which is a line of the frame buffer memory 90. However, it is also possible to provide each window with a completion bit 93 so as to be corresponded to such a sub window.

According to the first mechanism described above, the error information read by the host system 10 consists of only one bit provided for each transfer to one window area. It is thus possible to reduce the capacity of the interface used for the transfer from the display 30 to the host system 10.

Next, a description will be made for the second error handling mechanism in this embodiment with reference to FIGS. 13 to 16. In this second mechanism, a sub window, which is a unit for detecting a transfer error, is partitioned in bits in both vertical and horizontal directions, so that the error of a transferred packet is handled and the packet is re-transferred in such the unit.

FIG. 13 shows another example of such the transfer error handling. In FIG. 13, reference symbol 99 denotes a sub window. This sub window 99 is assumed to be a small rectangular area whose size is 64 pixels (horizontal)×32 pixels (vertical). Reference symbol 100 denotes a window area. Reference symbol 101 denotes an error address register containing address information for identifying a packet, etc. Reference symbol 102 is a pointer register denoting the number of errors.

FIG. 14 shows a transfer error occurred during a transfer of the window area 100.

FIG. 15 shows another transfer error occurred during a re-transfer operation.

FIG. 16 shows how a transfer sequence is ended after a re-transfer operation.

As shown in FIG. 13, the display 30 is provided with a plurality of registers (M: #0 to #(M−1)) in the error address register 101. Each of the registers is used to store address information of a sub window 99 in which a transfer error is detected. This M(Max. value) can be decided freely in consideration of the error rate in the object system including the host system 10 and the display 30. Generally, this error address register 101 contains a packet number, but the packet number may be replaced with any other item that can identify a packet. The display 30 is also provided with a pointer register 102 denoting a pointer for each of those registers and to be increased in value according to the number of address information stored in the error address register 101. This pointer register 102 is reset to the default value "0" after it is reset by Power ON.

If the host system 10 begins transferring of video data so as to update displayed data in the window area 100 on the display 30, the minimum unit sub windows for covering the window area 100 are decided. The host system 10 thus transfers packetized data to each of those sub windows sequentially. The display 30 then decides the sub window 99 to which packetized data is transferred according to the sub window address field 75 of the header 72 of each packetized data 71, thereby writing image data in the corresponding frame buffer memory 90.

When the first packet is transferred to the window area 100, both start transfer bit 79 and sync data bit 80 in the header 72 are turned on. The sync data bit 80 is used to detect a packet transferred to the first sub window 99 in the window area 100 of the display 30 so as to adjust the synchronization with the host system 10. The display 30, detecting ON of the start transfer bit 79, initializes the value of the pointer register 102 to "0." After that, the display 30 refers to the sub window address field 75 of the packetized data 71 so as to decide the sub window 99 corresponding to the received video data. Then, the display 30 writes the video data included in the body 73 of the packet in the frame buffer memory 90 corresponding to the sub window 99. At the same time, the display decides whether or not a transfer error has occurred according to the output from the comparator 85. When detecting a transfer error, the display 30 records, for example, the address value of the sub window 99 in the error address register 101 denoted by the pointer register 102 and increases the value of the pointer register 102 by one. If no uncorrectable transfer error occurs, no operation is done.

To start transferring of the second and subsequent packets to the window area 100, both start transfer bit 79 and sync data bit 80 are turned off. Just like the first packet transfer, the display 30 refers to the sub window address field 75 of the packetized data 71 so as to decide the sub window 99 to which video data is to be transferred, then writes the video data in the frame buffer memory 90 corresponding to the sub window 99. At the same time, the display 30 handles a transfer error if any.

Ending the transferring of all the packets to the window area 100, the display 30 sets the value of the pointer register 102 to P($0 \leq P \leq M$). The host system 10 checks the value of the pointer register 102 of the display 30. If the checked value P is P=0, the host system 10 regards that the transfer of all the packets to the window area 100 is ended with no error and exits the transfer sequence for the window area 100. If the checked value P is not P=0, the host system 10 decides that a transfer error has occurred in a sub window 99 and reads the error address registers 101 for #0(the 1st packet) to #(P−1)(the P-th packet) and begins executing of the re-transfer sequence for the window area 100.

The re-transfer sequence is executed in the following procedure.

i) If the checked value is P<M, the host system 10 transfers only the packets for the P sub windows 99 denoted by the values of the error address registers 101 of #0 to #(P−1) to the display 30 sequentially.

ii) If the checked value is P=M, the host system 10 transfers the packets to the display 30 not only for the P sub windows 99 denoted by the values of the error address registers 101 from #0 to #(P−1), but also for the sub windows 99 in all the window areas 100 having larger values than the value of the error address register 101 of the #(P−1).

When the first packet is re-transferred to the window area 101, the start transfer bit 79 in the header 72 is turned on. At this time, the sync data bit 80 is turned off. The display 30, detecting ON of the start transfer bit 79, initializes the value of the pointer register 102 to "0." After that, the display 30 writes video data in the frame buffer memory 90 corresponding to the sub window 99 denoted by the sub window address field 75. At the same time, if a transfer error occurs, the display 30 records the address value of the sub window 99 in the error address register 101 denoted by the pointer register 102 so as to increase the value of the pointer register 102 by one. If no transfer error occurs, the display 30 executes no operation.

To start re-transferring of the second and subsequence packets, the start transfer bit 79 in the header 72 is turned off to start re-transferring of the packets in the same way. In the same way as the above case, the display 30 handles an error if it is detected.

Ending the re-transferring of all the packets in the re-transfer sequence, the display 30 sets P($0 \leq P \leq M$) for the value of the pointer register 102. The host system 10 checks the value of the pointer register 102 of the display 30. If the checked value P is P=0, the host system regards that all the packets to the window area 100 have been transferred with no error. The host system 10 thus exits the transfer sequence for the window area 100. If the checked value P is not P=0, the host system reads the error address registers 101 of #0 to #(P−1) and repeats the re-transfer sequence again.

The error check and the flow of the re-transfer sequence operation described above will be described more in detail with reference to FIGS. 13 through 16.

Just like the description with reference to FIG. 10, the total area of the panel 40 has a resolution of QXGA (2048×1536 dots) in the second error handling mechanism shown in FIG. 13. Because the sub window 99 is a small rectangular area whose size is 64 pixels (horizontal)×32 pixels (vertical), the total display area is divided into 1536 sub windows 99 (32 rows×48 columns). And, four error address registers 101 (#0 to #3) are provided.

As shown in FIG. 13, it is premised in this embodiment that the target window area 100 is started at the 8th sub window from the left in a row and at the 12th sub window from the top in a column (coordinates (8, 12)) and ended at the 17th sub window from the left in a row and at the 21st sub window from the top in a column (coordinates (17, 21)) covered by a rectangular area consisting of 100 sub windows 99. Concretely, the first packet (packet #1) for transferring video data to the window area 100 is corresponding to the sub window 99 whose coordinates are (8, 12) and the second packet (packet #2) is corresponding to the sub window 99 whose coordinates are (9, 12). And, the last 100th packet is corresponding to the sub window 99 whose coordinates are (17, 21).

Assume now that a transfer error has occurred in the transfer of each of the 10th packet (to the sub window whose coordinates are (17, 12)), the 20th packet (to the sub window whose coordinates are (17, 13)), the 30th packet (to the sub window whose coordinates are (17, 14)) and the 90th packet (to the sub window whose coordinates are (17, 20)) during the transfer of those 100 packets as shown in FIG. 14. When the last 100th packet is transferred, the value of the pointer register 102 is "4." The host system 10 reads this value, then the value of the four error address registers 101 (#0 to #3).

Because the value of the pointer register 102 read by the host system 10 is not "0," the host system begins execution of a re-transfer sequence for the same window area 100. In this re-transfer sequence, the host system 10 writes video data in the frame buffer memory 90. The video data is for the four sub windows 99 denoted by the values of the read error address registers 101. The four sub windows 99 are selected from the 100 sub windows covering the window area 100. Together with the video data from those four sub windows 99, the host system 10 transfers packetized image data for all the sub windows 99 following the sub window 99 denoted by #3 of the error address register 101. The packetized image data is written in the frame buffer memory 90. This is because the value read from the error address register 101 is the maximum value (=4), so a transfer error might possibly occur even in a sub window 99 following the sub window denoted by #3.

See FIG. 15 and assume now that a transfer error has occurred in the transfer to each of the two sub windows whose coordinates are (10, 21) and (15, 21) in this re-transfer sequence. When the transfer of the last packet is ended, the value of the pointer register 102 is "2." The host system 10 reads this value, then the values of the error address registers 101 of #0 and #1.

Because the value of the point register 102 read by the host system 10 is not "0" yet, the host system 10 begins execution of another re-transfer sequence for the same window area 100. This time, the host system 10 transfers two packets of image data for the two sub windows 99 denoted by the values of the read error address registers 101 selected from the 100 sub windows covering this window area 100. The image data is then written in the corresponding frame buffer memory 90. At this time, because the value of the read pointer register 102 is "2" and not the maximum value "4," it is decided that only two transfer errors have occurred.

See FIG. 16 and assume now that no transfer error has occurred in this re-transfer sequence. At this time, the value of the point register 102 is kept at "0" when the transfer of the last second packet is ended. The host system 10 reads this value and exits the transfer sequence for the window area 100.

According to this second mechanism, it is no need to provide a completion bit 93 for each sub window, although it is needed in the first mechanism. Redundant consumption of the logic can thus be prevented. In addition, it is no need to re-transfer packets for all the window areas, thereby it is only needed to re-transfer a packet for the error-detected sub window 99. This is an advantage of the second mechanism.

As described above in detail, according to this embodiment, it is possible to identify a packet skip according to the information of a simple-composition order counter when a transfer error occurs in the header 72 of a packet. Consequently, it is possible to handle the error without using ACK/NACK for confirming data exchanges even when the display 30 does not refresh packetized data to be transferred continuously.

Embodiment 2

In the embodiment 1, each of the host system 10 and the display 30 is provided with a counter so as to recognize a transfer error according to the order counter information included in each packet. In this embodiment 2, however, the counter is replaced with another item so as to recognize a transfer error to be caused by the header 72 of each packet.

For example, the total number of transfers is used to handle an error. Concretely, the total number of transfers for a window screen is notified to the display 30 with use of a packet, etc. The number of transfers is thus counted by the counter (not illustrated) of the display 30, thereby the total number of transfers is compared with the actual number of transfers after the transfer operation is ended. When the transfer for a window screen is ended, if the notified total number of transferred packets does not match the actual number of transferred packets counted by the counter of the display 30, then it is decided that any packet in the packet set is not transferred. In this case, although packets must be re-transferred until the mismatch is eliminated, the method is still effective when the error rate is low and the number of packet sets is less.

There is also another method; instead of the counter, chained packet information is notified to the display 30 so as to detect and process an error. For example, the host system 10 sets an ID of the previous or next packet in the header 72 and this ID is transferred to the display 30. Receiving this ID, the display 30 compares it with the value of the next received packet so as to detect a packet skip. This method may be considered as a variation of the embodiment 1. A packet ID is used as a means for recognizing the order of each packet.

According to the embodiments 1 and 2 described above, therefore, it is possible to re-transfer not only a packet in which an error has occurred in its body 73 (data part), but also a packet skipped due to an error occurred in the header 72. Concretely, even when packetized video data is transferred between the host system 10 and the display 30, it is possible to process such an error as a packet skip, which cannot be detected completely with a parity set in the header 72. For example, it is possible to process such an error as a packet skip overlooked by the display 30 that cannot recognize respective packets completely.

We claim:

1. A method for displaying an image on a display connected to a host system that executes an application program by transferring said image from said host system to said display via an interface, the host system including a two-bit host counter and the display including a twelve-bit display counter, the method comprising the steps of:

causing said host system to control a group of image data belonging to a window according to a sub window, which is a division of said window on said display, said window being an area meaningful as a whole in an image space recognized by said application program;

packetizing a group of said image data controlled by said host system;

adding order information denoting a packet order from the host counter to said packetized data to be transferred to said display via said interface;

developing said image data transferred via said interface in a panel memory of said display;

causing said display to detect a packet skip by comparing the order information with the least significant bits of the display counter; and causing said host system to know via said interface the status of said packet skip detected by said display.

2. The method of displaying an image according to said claim 1, wherein said method further comprises the step of causing said host system to re-transfer image data to said display via said interface according to the status of said packet skip known by said host.

3. The method of displaying an image according to claim 2, wherein:

said re-transferring of image data is done for every sub window belonging to said window; and said developing of image data in said panel memory is done again only for a sub window in which said packet skip is detected by said display.

4. The method of displaying an image according to claim 2;

wherein said re-transferring of image data is done for a sub window in which said packet skip has occurred and it is known by said host system.

5. The method of displaying an image according to claim 1, wherein:

said order information is order counter information stored in a header of said packet; and said display detects said packet skip according to a value of its own order counter.

6. An image display system for displaying an image on said display, comprising:

a host system for executing an application program;

a display connected to said host system; and an interface for connecting said host system to said display, wherein said interface comprises:

a first interface for transferring packetized data including ID information from said host system to said display together with two-bit order information denoting a packet order; and a second interface for transferring data from said display to said host system together with error information of said packet transfer recognized according to said order information, wherein the error information is generated by comparing the order information with the least-significant bits of a twelve-bit display counter.

7. The image display system according to claim 6, wherein:
said host system transfers image data that is not developed yet via said first interface; and
said display has a panel memory for developing said image data transferred via said first interface and transfers error information of said image data developed in said panel memory via said second interface.

8. An image display system, comprising:
a host system for controlling a group of image data belonging to a window according to a sub window, which is a division of said window, said window being an area meaningful as a whole in an image space recognized by an application program;
a display connected to said host system and used to display an image; and
an interface for connecting said host system to said display, wherein:
said host system packetizes a group of said image data and transfers said packetized image data to said display via said interface, said packetized image data being added with an ID for distinguishing said window from others and count information counted up for each said ID; and
said display develops said image data included in said packet transferred via said interface in said panel memory, said display having a counter counted up for each transferred packet so that said system recognizes an individual transfer error according to a result of comparison between a least-significant value of said counter and said count information included in said packet, wherein the maximum count of the count information is less than the maximum count of the counter.

9. The image display system according to claim 8, wherein:
said display has a plurality of handlers used for processing image data with respect to each said ID; and
said counter is provided for each of said plurality of handlers.

10. A host system connected via an interface to a display for displaying an image, said host system being used for executing an application program, comprising:
an order information setting device for allocating order information to each window, which is a display area meaningful as a whole in an image space recognized by said application program;
an image data transferring device for transferring image data to said display, said image data being divided into predetermined spatial areas in said window and added with said order information allocated by said order information setting device; and
a display counter configured to count up for each received image data so that the display recognizes an individual transfer error according to a comparison between a least-significant value of the display counter with the two-bit order information, wherein the capacity of the order information is smaller than the capacity of the display counter.

11. The host system according to claim 10, wherein:
said image data is transferred as packetized data; and
said order information allocated by said order information setting device is count information counted up for each transferred packet with respect to each window.

12. The host system according to claim 10, wherein said image data transferring device adds an ID allocated for each window to said image data before said image data is transferred, separately from said order information.

13. The host system according to claim 10, further comprising a receiving device for receiving a transfer error state detected according to said order information from said display,
wherein said image data transfer device re-transfers image data according to said transfer error state received by said receiving device.

14. An image display apparatus, comprising:
a panel, for displaying an image;
a receiving device for receiving packetized data including a two-bit count information via an interface from a host system, the host system being adapted for executing an application program;
a counter for counting said packetized data received by said receiving device sequentially;
a comparing device for comparing a value of least-significant bits of said counter with said two-bit count information included in said packetized data received by said receiving device; and
a detecting device for detecting packetized data in which a transfer error occurs, according to a result of comparison executed by said comparing device;
a notifying device for notifying said host system of a transfer error detected in packetized data according to a result of detection executed by said detecting device, said receiving device receives packetized data re-transferred from said host system; and
a frame buffer memory for developing image data from said packetized data received by said receiving device and to be transferred to said panel, wherein no image data is developed in said frame buffer memory from packetized data in which a transfer error is detected by said detecting device while image data is developed in said frame buffer memory according to said re-transferred packetized data if said receiving device receives re-transferred packetized data.

15. An image display apparatus, comprising:
a receiving device for receiving image data from a host system that executes an application program, said receiving device including a counter, said image data being packetized in predetermined divisions of an image space recognized by said application program and including a packet count, wherein the capacity of the packet count is less than the capacity of the counter;
a panel memory for sequentially developing image data consisting of said packetized data received by said receiving device;
a panel for displaying an image according to image data developed by said panel memory; and
a notifying device for recognizing a transfer skip of said packetized data received by said receiving device and notifying said host system of information about said transfer skip recognized in a unit of packetized data developed in said panel memory, said notifying device configured to compare the least-significant bits of the counter with the packet count.

16. The image display apparatus according to claim 15, further comprising a register for storing information of packetized data in which a transfer skip is detected,
wherein said transfer skip notifying device notifies said host system of information about a transfer skip according to information of said packetized data stored in said register.

17. An interface for display, used to transfer image data to a display with respect to a window, which is an area meaningful as a whole in an image space recognized by an application program, said image data being packetized for each predetermined sub window belonging to said window, wherein said packet is structured so as to comprise:
- a header including information denoting a window to which said packet belongs and count information of said packet, the capacity of the count information being smaller than the capacity of a packet count maintained by the display;
- a body including image data belonging to said sub window of said display; and
- a footer including information for confirming a transfer error.

18. The interface for display according to claim 17, wherein said header includes information for identifying whether or not said packet is a re-transferred one so as to re-transfer image data.

* * * * *